US012658763B2

(12) United States Patent　　　　(10) Patent No.: US 12,658,763 B2
Kim et al.　　　　　　　　　　　　　(45) Date of Patent: Jun. 16, 2026

(54) FAN MOTOR HAVING A VANE STRUCTURE FOR COOLING EFFICIENCY

(71) Applicant: LG ELECTRONICS INC., Seoul (KR)

(72) Inventors: Sunho Kim, Seoul (KR); Taekyung Kim, Seoul (KR); Giyeob Yang, Seoul (KR); Jounyoung Kim, Seoul (KR); Seongho Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 203 days.

(21) Appl. No.: 18/672,437

(22) Filed: May 23, 2024

(65) Prior Publication Data

US 2025/0125685 A1　Apr. 17, 2025

(30) Foreign Application Priority Data

Oct. 11, 2023　(KR) ......................... 10-2023-0135226

(51) Int. Cl.
　H02K 9/06　　　(2006.01)
　H02K 5/173　　(2006.01)
　(Continued)

(52) U.S. Cl.
　CPC ............. H02K 9/06 (2013.01); H02K 5/1732 (2013.01); H02K 7/083 (2013.01); H02K 21/16 (2013.01)

(58) Field of Classification Search
　CPC .. H02K 9/06; H02K 9/04; H02K 9/02; H02K 9/00; H02K 5/1732; H02K 5/173;
　(Continued)

(56) References Cited

U.S. PATENT DOCUMENTS

2018/0064302 A1　3/2018　Lee et al.
2022/0010811 A1*　1/2022　Kim ......................... H02K 9/06
　(Continued)

FOREIGN PATENT DOCUMENTS

CN　　　113530868　　　10/2021
EP　　　4199324 A1 *　6/2023　............... H02K 3/24
　(Continued)

OTHER PUBLICATIONS

Machine Translation of JP 2014001731 A (Year: 2014).*
　(Continued)

*Primary Examiner* — Alexander A Singh
*Assistant Examiner* — Charlie Frank Mann, Jr.
(74) *Attorney, Agent, or Firm* — KED & ASSOCIATES

(57) ABSTRACT

A fan motor may include a motor housing that guides a flow of air generated by an impeller. The motor housing may include an outer wall, and an inner wall disposed inside of the outer wall and spaced apart from the outer wall. The motor housing may include at least one vane that extends between the outer wall and the inner wall to guide the flow of air. The motor housing may further include at least one vane extension portion that extends from a downstream end of the at least one vane to cover at least a portion of a thickness surface of the inner wall. With this structure, the at least one vane extension portion may improve a cooling performance of the motor while minimizing flow loss due to a vortex generated while some of the air flowing along a flow path flows to a motor accommodating portion.

19 Claims, 12 Drawing Sheets

(51) Int. Cl.
   *H02K 7/08* (2006.01)
   *H02K 21/16* (2006.01)

(58) Field of Classification Search
   CPC .. H02K 5/16; H02K 5/04; H02K 5/00; H02K
   7/083; H02K 7/08; H02K 7/00; H02K
   21/16; H02K 2213/03
   See application file for complete search history.

(56) References Cited

U.S. PATENT DOCUMENTS

| | | | |
|---|---|---|---|
| 2023/0188006 A1 | 6/2023 | Jang et al. | |
| 2023/0291250 A1* | 9/2023 | Yang | F04D 29/5806 |

FOREIGN PATENT DOCUMENTS

| | | | | | |
|---|---|---|---|---|---|
| JP | 2014001731 | | 1/2014 | | |
| JP | 2014001731 A | * | 1/2014 | | H02K 5/173 |
| JP | 2018155238 A | * | 10/2018 | | |
| JP | 2020094536 | | 6/2020 | | |
| JP | 2020094536 A | * | 6/2020 | | F04D 29/542 |
| JP | 2022081862 | | 6/2022 | | |
| KR | 20230006788 A | * | 1/2023 | | H02K 7/14 |
| KR | 102512291 | | 3/2023 | | |
| KR | 10-2023-0072178 | | 5/2023 | | |
| KR | 20230133064 A | * | 9/2023 | | H02K 9/06 |
| KR | 1020230133064 | | 9/2023 | | |

OTHER PUBLICATIONS

Text Version of EP 4199324 A1 (Year: 2023).*
Machine Translation of KR 20230133064 A (Year: 2023).*
Machine Translation of KR 20230006788 A (Year: 2023).*
Machine Translation of JP 2020094536 A (Year: 2020).*
Machine Translation of JP 2018155238 A (Year: 2018).*
International Search Report dated Sep. 11, 2024, issued in Application No. PCT/KR2024/007012.
European Search Report issued in Application No. EP 24877340.0 dated Mar. 13, 2026.

\* cited by examiner

FAN MOTOR HAVING A VANE STRUCTURE FOR COOLING EFFICIENCY

CROSS-REFERENCE TO RELATED APPLICATION(S)

Pursuant to 35 U.S.C. § 119(a), this application claims the benefit of the earlier filing date and the right of priority to Korean Patent Application No. 10-2023-0135226, filed in Korea on Oct. 11, 2023, the contents of which are incorporated by reference herein in their entirety.

BACKGROUND

1. Field

A fan motor is disclosed herein.

2. Background

Motors may be installed in home appliances, such as vacuum cleaners, and hair dryers, for example. A vacuum cleaner or a header dryer may generate a rotational force using an electric motor as a power source.

For example, a motor may be coupled to a fan. The fan may rotate at high speed by receiving power from the electric motor to generate an air flow.

A user operates a handy-stick cleaner or a hair dryer while holding it with a hand. In order to enhance user's portability and convenience, a reduction in size and weight of a cleaner or a hair dryer is required. In order to reduce a weight of a fan motor of a cleaner, a plastic material may be used instead of a metal material as a housing material.

A fan motor is disclosed in Prior Art Patent Document Chinese Patent No. 113530868 (hereinafter, referred to as "Patent Document 1"), which is hereby incorporated by reference, related to a vane structure of a fan motor. According to Patent Document 1, a fixed impeller includes a hub, a support portion, a plurality of blades, and a deflector. The plurality of blades is disposed on an outer peripheral surface of the support portion. The plurality of blades is disposed to be spaced apart from each other on an outer end of the hub along a circumferential direction. One end of the deflector is connected to the support portion, and the other end of the deflector extends toward the central axis of the hub.

With this configuration, air may flow into the motor through a hole formed in the support portion and then be guided through the deflector. However, when Patent Document 1 is applied to a small fan motor, there is a problem in that the deflector cannot be installed due to non-existence of an extra space inside of a motor housing.

Further, in Patent Document 1, air is dispersed along flow paths separated from each other due to the blades which extend along an outer peripheral surface of the support portion, and the deflector which extends into an arcuate shape from an inner peripheral surface of the support portion toward a center axis of the hub. Flow loss increases due to drastic changes in the flow paths.

A fan motor assembly is disclosed in Prior Art Patent Document, Korean Patent No. 10-2023-0072178 (hereinafter, referred to as "Patent Document 2"), which is hereby incorporated by reference, related to a vane structure of a fan motor. According to Patent Document 2, a portion of an inner wall to which an inner end of a guide vane is connected is removed, and thus, an opening is formed through the portion of the inner wall toward the motor in a radial direction. Air moves axially along the guide vane and moves to the motor through the opening to cool the motor. However, as the guide vane of Patent Document 2 does not take into account a thickness between an outer peripheral surface and an inner peripheral surface of the inner wall and is not disposed on a thickness surface, a vortex of air is generated on the thickness surface during movement of the air to the motor through the opening, thereby causing flow loss.

BRIEF DESCRIPTION OF THE DRAWINGS

Embodiments will be described in detail with reference to the following drawings in which like reference numerals refer to like elements, and wherein:

FIG. 8A is a cross-sectional view illustrating a radial cross-section of the motor housing, and FIG. 8B is a conceptual view of the motor housing viewed in the axial direction;

FIG. 9A is a cross-sectional view of a radial cross-section of the motor housing, and FIG. 9B is a conceptual view of the motor housing viewed in the axial direction;

DETAILED DESCRIPTION

Hereinafter, a fan motor according to an embodiment will be described in detail with reference to the accompanying drawings.

In the following description, in order to clarify characteristics, descriptions of some components may be omitted.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

A "fan motor" used in the following description may be understood as a concept meaning a device that suctions or blows air by rotating a fan using a power source such as an electric motor.

The term "radial" as used in the following description means a shape that extends like the spokes of a wheel in all directions from a central point.

The term "thrust" used in the following description means a force applied by a fluid such as air to an impeller in a direction opposite to an axial direction when the impeller suctions the fluid in the axial direction, namely, a force acting on the impeller or a rotational shaft on which the impeller is mounted.

The term "axial direction" used in the following description means a longitudinal direction of the rotational shaft.

The term "radial direction" used in the following description means a longitudinal direction of a line segment from a center of a circle or cylinder to a point on a circumference of a circle.

The term "axial direction" used in the following description means a direction of a circumference of a circle.

Figure 1:
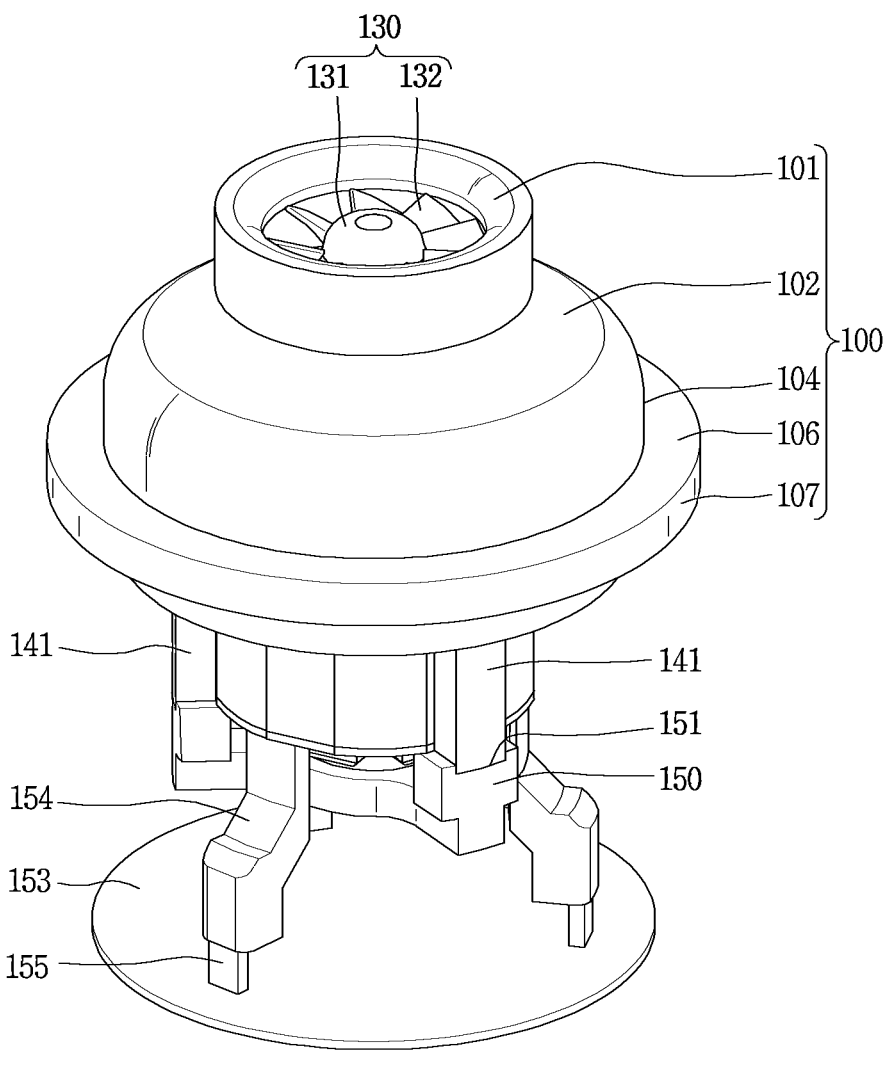
FIG. 1 is a perspective view of a fan motor according to an embodiment.
Figure 2:
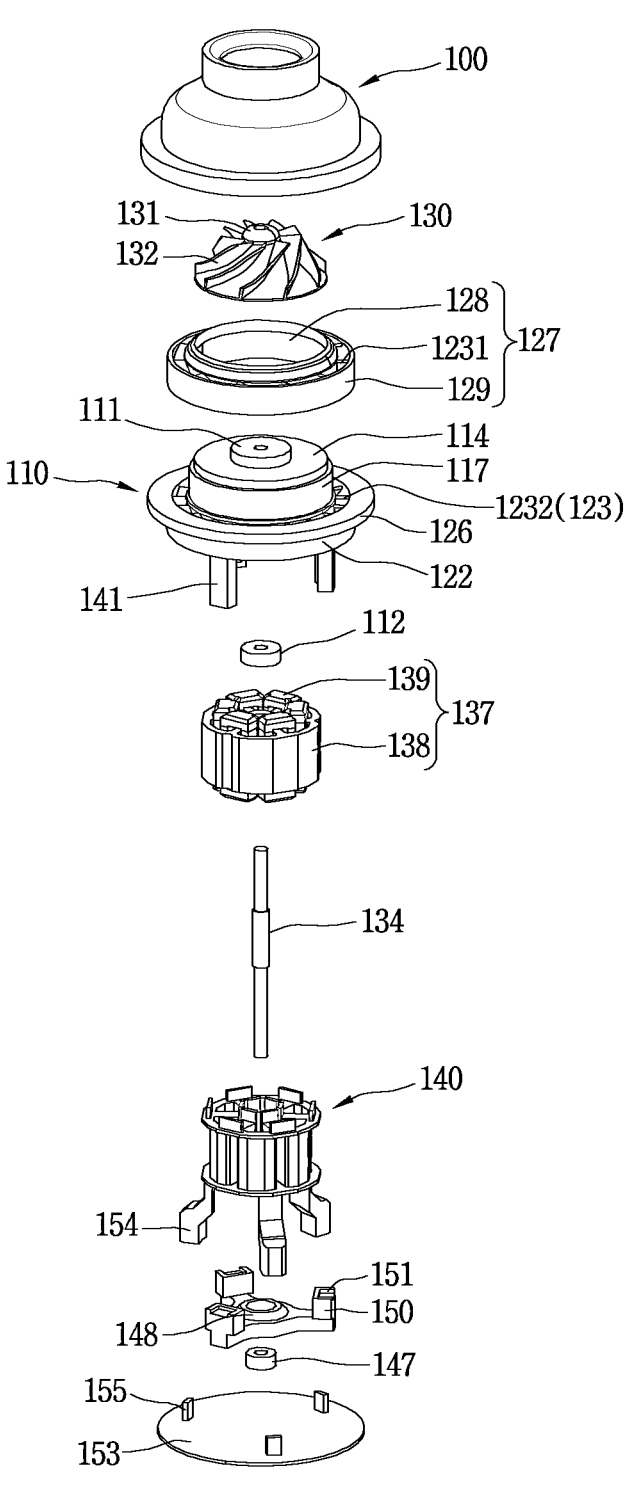
FIG. 2 is an exploded view of the fan motor in FIG. 1.
Figure 3:
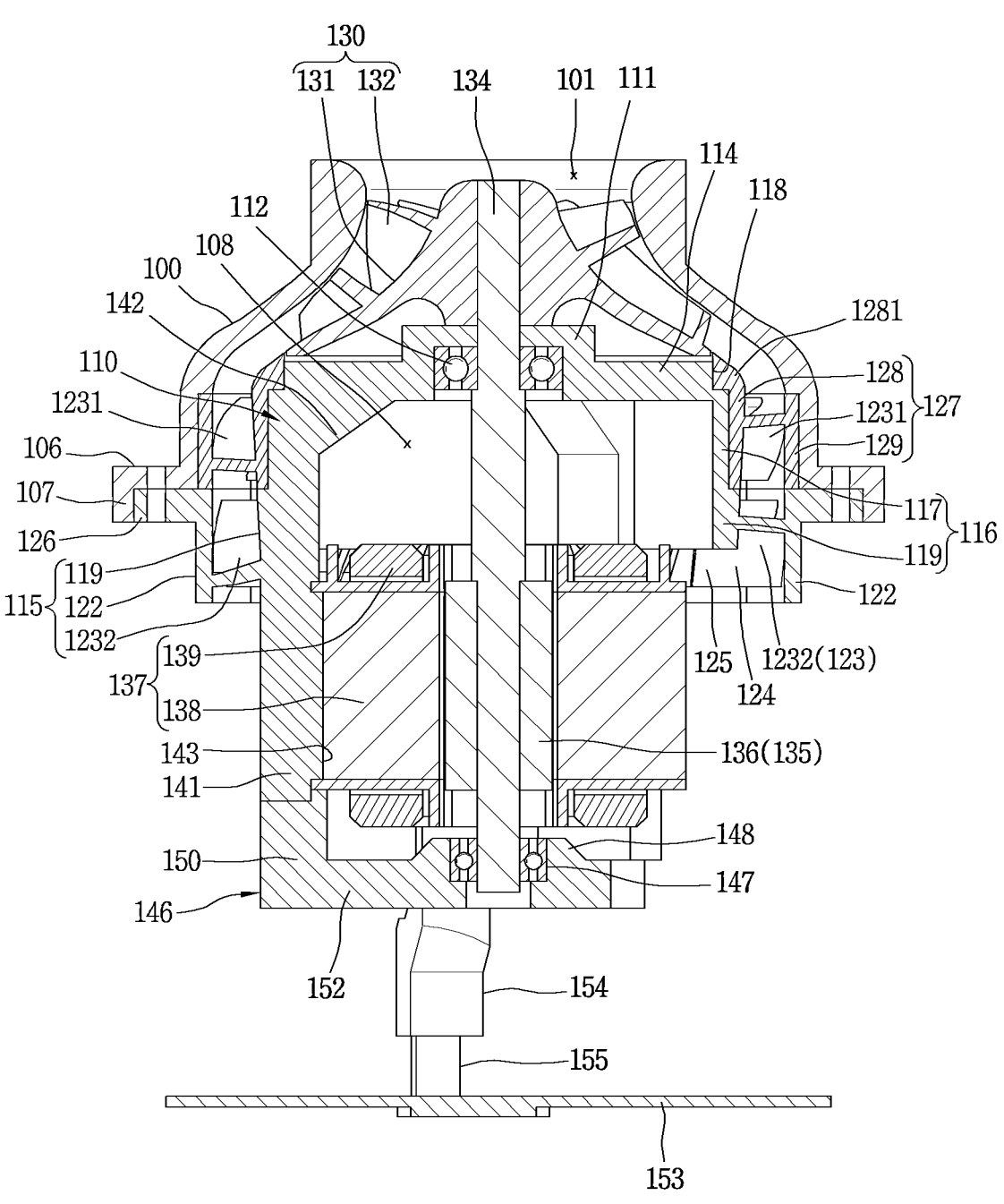
FIG. 3 is a cross-sectional view for explaining an internal configuration of the fan motor in FIG. 1.

FIG. 1 is a perspective view of a fan motor according to an embodiment. FIG. 2 is an exploded view of the fan motor in FIG. 1. FIG. 3 is a cross-sectional view for explaining an internal configuration of the fan motor in FIG. 1.

Figure 4:
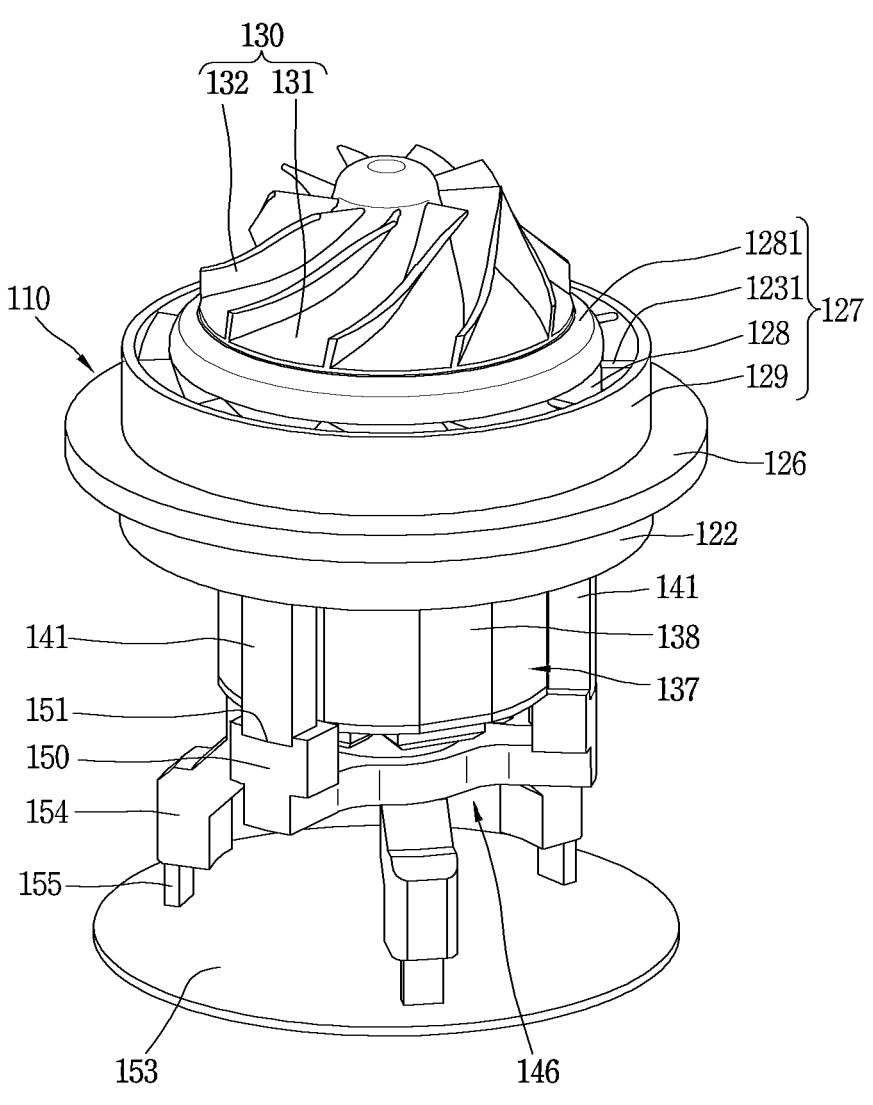
FIG. 4 is a conceptual view of a state in which a shroud in FIG. 1 is removed.
Figure 5:
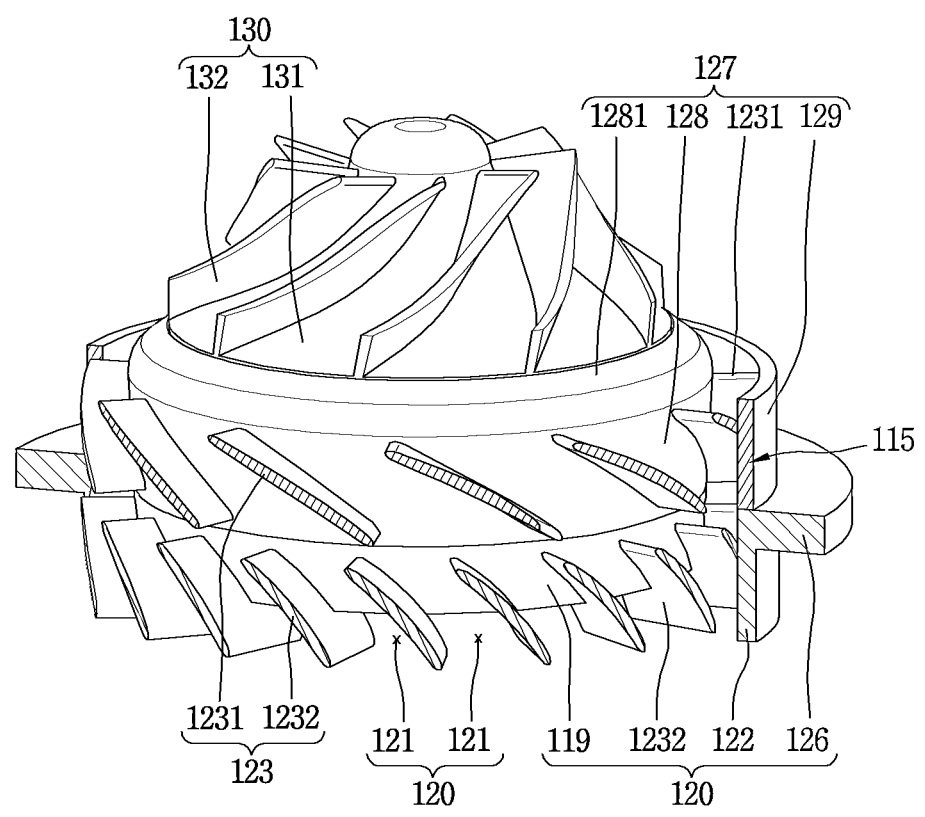
FIG. 5 is a conceptual view of a two-stage vane in FIG. 1.
Figure 6:
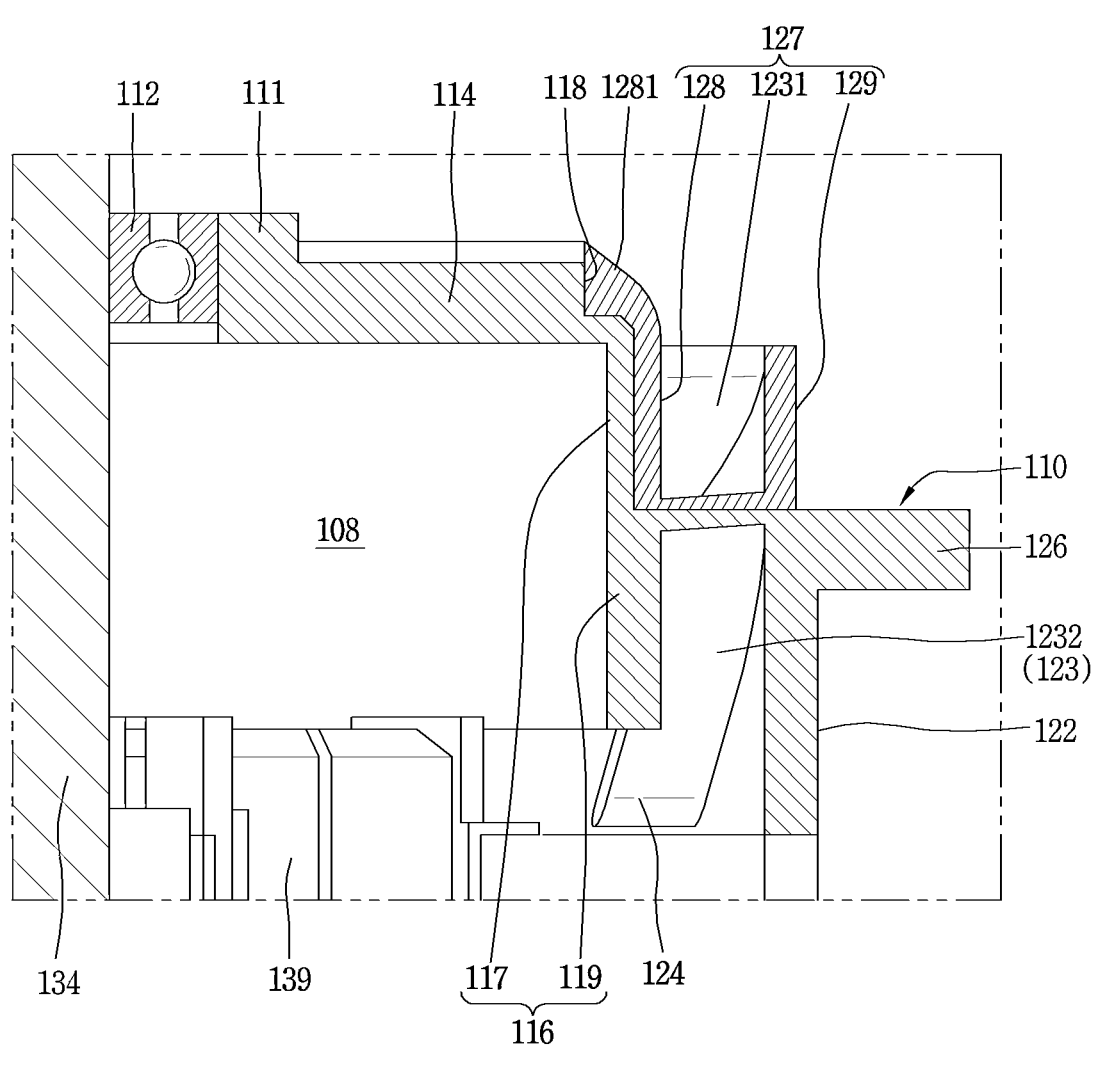
FIG. 6 is an enlarged conceptual view of a flow path part in FIG. 3.
Figure 7:
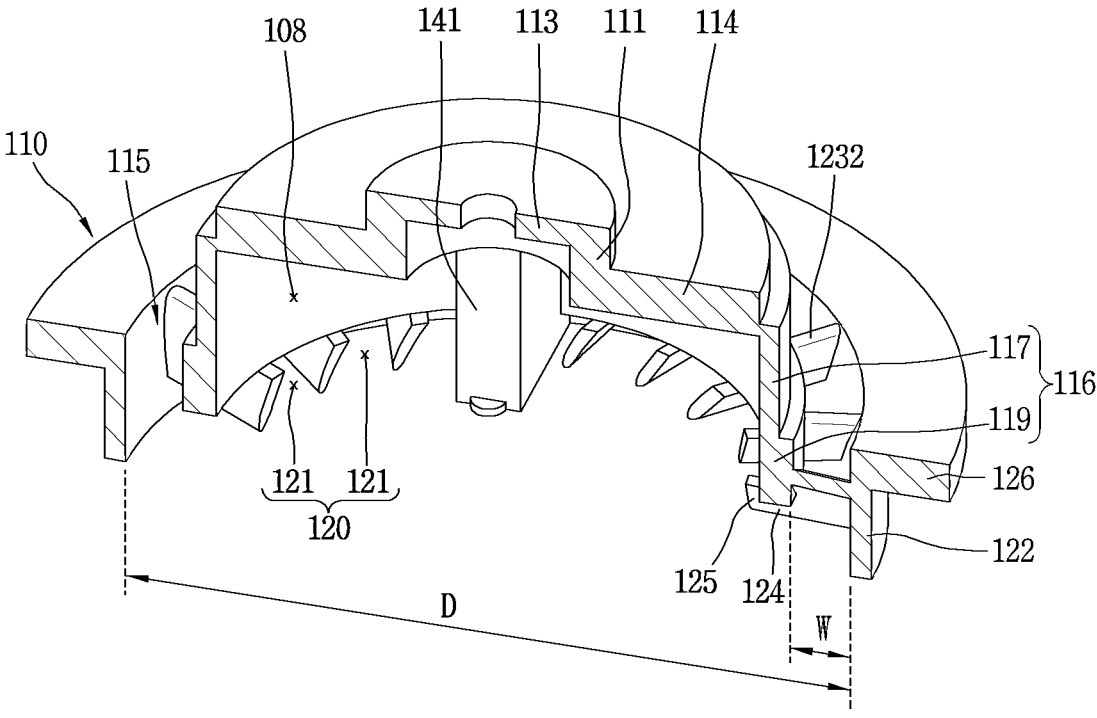
FIG. 7 is a conceptual view of a vane extension portion and a vane protrusion portion disposed on an outlet end of a vane of a motor housing according to an embodiment in FIG. 3.
Figure 8A:
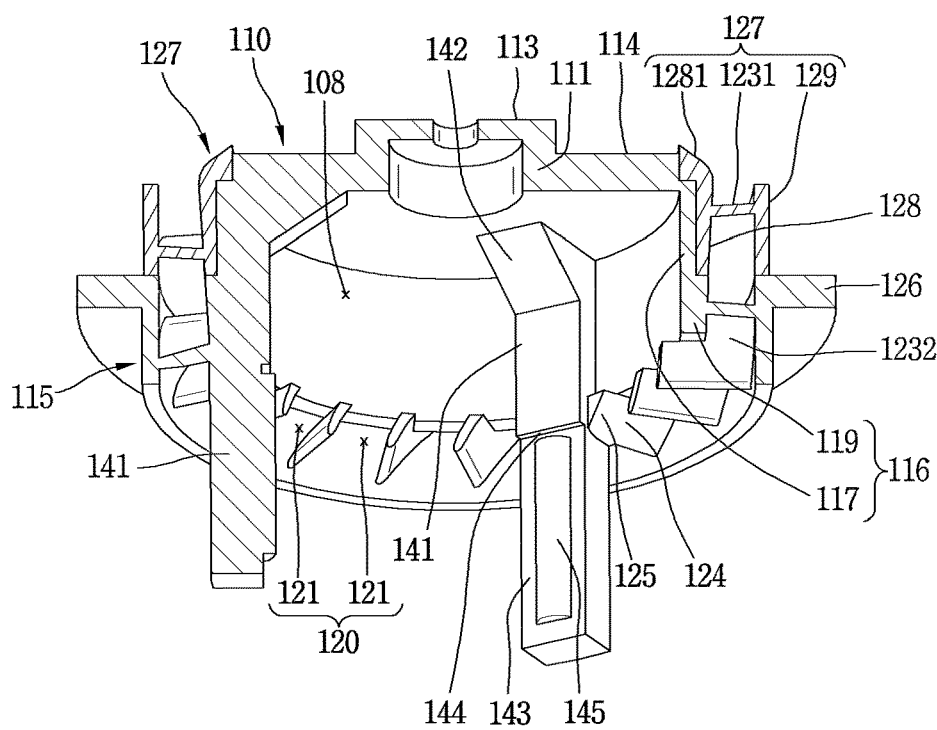
FIGS. 8A-8B are conceptual views of the vane protrusion portion extending in a radial direction from the vane of the motor housing according to an embodiment in FIG. 3, where
Figure 8B:
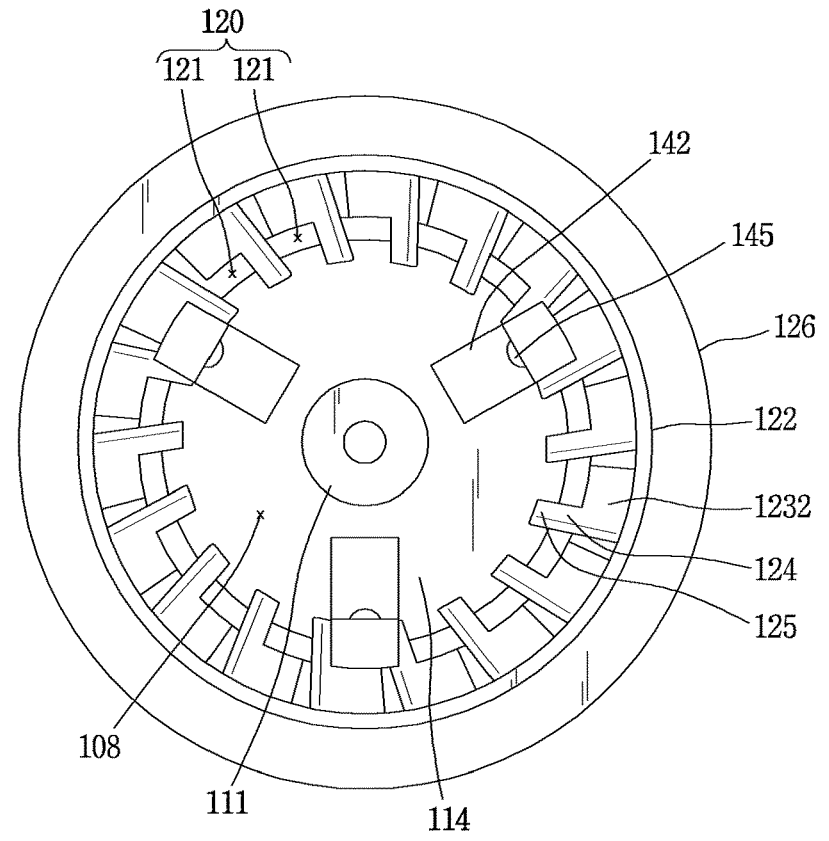

FIG. 4 is a conceptual view of a state in which a shroud in FIG. 1 is removed. FIG. 5 is a conceptual view of a two-stage vane in FIG. 1. FIG. 6 is an enlarged conceptual view of a flow path part in FIG. 3. FIG. 7 is a conceptual view of a vane extension portion and a vane protrusion portion disposed on an outlet end of a vane of a motor housing according to an embodiment in FIG. 3. FIGS. 8A-8B are conceptual views of the vane protrusion portion extending in a radial direction from the vane of the motor housing according to an embodiment in FIG. 3, where FIG. 8A is a cross-sectional view of a radial cross-section of the motor housing, and FIG. 8B is a conceptual view of the motor housing 1 viewed in an axial direction.

A fan motor according to embodiments may be applied to home appliances, such as a handy-stick cleaner, for example.

The fan motor may mainly include a casing, an impeller 130, and a motor 133. The casing may define appearance of the fan motor. The casing may include a shroud 100 and a first housing 110. The first housing 110 may be referred to as a motor housing in the sense that it accommodates the motor therein. The casing may be formed of a plastic material, for example.

The shroud 100 has an accommodation space in which the impeller 130 is accommodated. Additionally, the accommodation space of the shroud 100 may accommodate a portion of a vane 123, a portion of the motor housing 110, or a first bearing 112, which will be described hereinafter.

Movement paths of air generated by the impeller 130 may be defined in a space between the shroud 100 and the impeller 130, in a flow path part (flow path) 115 described hereinafter, for example.

The shroud 100 may be formed in a cylindrical shape, for example. The shroud 100, however, may have different diameters along a longitudinal (lengthwise) direction of a cylinder.

The shroud 100 may include a suction port 101, an inclined portion 102, and a linear portion 104. The components of the shroud 100 may be disposed in the order from an upstream side to a downstream side of the shroud 100 based on an air flow direction.

The suction port 101 may be located at an upstream end portion of the shroud 100. The suction port 101 may be formed in a cylindrical shape, for example. The suction port 101 may have a relatively short diameter and length, compared to other components of the shroud 100. The suction port 101 may be formed through the shroud 100 in an axial direction. One end portion of the impeller 130 may be accommodated inside of the suction port 101. With this structure, air generated by the impeller 130 may be suctioned through the suction port 101.

The inclined portion 102 may be disposed at a downstream side of the suction port 101. The inclined portion 102 may be inclined with respect to a rotational shaft 134 so that its diameter gradually increases from the upstream side to the downstream side of the shroud 100.

The inclined portion 102 may be formed in a conic shape, for example, along a circumference of the suction port 101. The inclined portion 102 may be formed in a curved shape, for example. The inclined portion 102 may have different curvatures from the suction port 101 toward the linear portion 104 described hereinafter. One portion and another portion of the inclined portion 102 may have different curvatures which are opposite to each other.

A reinforcement portion may be formed on an edge portion where the suction port 101 and the inclined portion 102 are connected. The reinforcement portion may extend in a circumferential direction. The reinforcement portion may reinforce a strength of the shroud 100 by suppressing or preventing a reduction in thickness of the shroud 100 and increasing the thickness of the shroud 100 at the connected portion between the suction port 101 and the inclined portion 102.

The linear portion 104 may be formed in a cylindrical shape, for example.

The shroud 100 may be coupled to the motor housing 110. For example, a portion of the shroud 100 may be coupled to cover a portion of the motor housing 110. Alternatively, a portion of the shroud 100 may be connected in contact with a portion of the motor housing 110, which will be described hereinafter, and fastened with a fastening member such as a screw.

The shroud 100 may further include a first fastening portion 106. The first fastening portion 106 may be disposed on a downstream end portion of the shroud 100. The first fastening portion 106 may be coupled to a second fastening portion 126 of the motor housing 110, which will be described hereinafter.

The first fastening portion 106 may externally extend from a downstream side of the linear portion 104 in a radial direction. The first fastening portion 106 may extend in a circumferential direction along a downstream circumference of the linear portion 104. A plurality of first fastening holes may be formed through the first fastening portion 106 in the axial direction. The plurality of first fastening holes may be disposed to be spaced apart from one another along the circumferential direction.

A protrusion 107 may protrude axially from an outer end of the first fastening portion 106. The protrusion 107 may extend in the circumferential direction along the outer circumference of the first fastening portion 106. The protrusion 107 may be formed to surround an outer circumferential surface of the second fastening portion 126, which will be described hereinafter.

The rotational shaft 134 may be disposed in a center of the casing. The rotational shaft 134 may extend along the axial direction through the center of the casing.

One end portion of the rotational shaft 134 may be accommodated inside of the shroud 100. The impeller 130 may be rotatably mounted on the one end portion of the rotational shaft 134.

The impeller 130 may include a hub 131 and a plurality of blades 132. The impeller 130 may be configured in the form of a mixed flow fan, for example.

The hub 131 may be inclined so that its diameter increases along the axial direction. The diameter of the hub 131 may gradually increase from an upstream end portion to a downstream end portion of the hub 131 based on the air flow direction.

A shaft through-hole may be formed through the hub 131 in the axial direction such that the one end portion of the rotational shaft 134 is inserted through a central portion of the hub 131.

Each of the plurality of blades 132 may spirally extend along the axial direction of the hub 131. One (first) end portion of the blade 132 may protrude from one (first) axial end of the hub 131 in the radial direction. Another (second) end portion of the blade 132 may protrude from another (second) axial end of the hub 131 in the axial direction.

The plurality of blades 132 may be spaced apart from one another at preset or predetermined intervals along the circumferential direction of the hub 131.

With this configuration, the impeller 130 may rotate together with the rotational shaft 134. As the plurality of blades 132 rotate at high speed together with the hub 131, air may be moved in an inner space of the shroud 100 and thereby external air may be suctioned.

The motor housing 110 may be disposed at the downstream side of the shroud 100. The motor housing 110 may include a first bearing housing 111, a connection portion 114, the flow path part 115, and the second fastening portion 126. The rotational shaft 134 may be rotatably supported on both ends thereof by a first bearing 112 and a second bearing 147. The first bearing 112 may be disposed on one (first) side of the rotational shaft 134, for example, on an upstream side of the rotational shaft 134 based on the air flow direction. The second bearing 147 may be disposed on another (second) side of the rotational shaft 134, for example, on a downstream side of the rotational shaft 134 based on the air flow direction.

The first bearing 112 may be disposed on a downstream side of the hub 131 to be adjacent to the impeller 130.he first bearing 112 may be implemented as a ball bearing or an air bearing, for example.

A rotor 135 and a stator 137, which constitute a motor 133 to be described hereinafter, may be disposed between the first bearing 112 and the second bearing 147.

A first bearing support portion may be disposed on one side of the rotational shaft 134. The first bearing 112 may be, for example, press-fitted to the first bearing support portion.

The first bearing 112 may be accommodated in the first bearing housing 111. The first bearing housing 111 may be formed in a cylindrical shape, for example. The first bearing housing 111 may protrude in the axial direction from an inner end of the connection portion 114 toward the hub 131. The first bearing housing 111 may extend along the circumferential direction to surround an outer circumferential surface of the first bearing 112.

A second stopper 113 may protrude radially inward from one axial end of the first bearing housing 111. The first stopper 113 may restrict movement of the first bearing 112 in the axial direction while it is accommodated in the first bearing housing 111.

For example, when the impeller 130 rotates, air is suctioned into the inside of the shroud 100 through the suction port 101, moves along the inner surface of the shroud 100, and flows into a flow path part 115 to be described hereinafter. At this time, when the air moves in a first axial direction, namely, from the suction port 101 of the shroud 100 toward the first fastening portion 106, thrust may act in a second axial direction, which is opposite to the first axial direction, according to the action-reaction law. The thrust may act on the rotational shaft 134 and the impeller 130. According to this, the first stopper 113 restricts the first bearing 112 coupled to the rotational shaft 134 from being moved in the second axial direction due to the thrust.

The connection portion 114 may be formed in a disk shape, for example. The connection portion 114 may extend in the radial direction from an outer circumferential surface of the first bearing housing 111 toward an upstream end of an inner wall 116 of the flow path part 115, which will be described hereinafter. The connection portion 114 may extend in the circumferential direction along an outer circumference of the first bearing housing 111.

The connection portion 114 may connect the first bearing housing 111 and the flow path part 115. A radial inner side of the connection portion 114 may surround the outer circumferential surface of the first bearing housing 111. A radial outer side of the connection portion 114 may be connected to one end of the inner wall 116 of the flow path part 115.

The radial inner side of the connection portion 114 refers to one (first) end of the connection portion 114 that faces the rotational shaft 106 in the radial direction. The radial outer side of the connection portion 114 refers to another (second) end of the connection portion 114 that faces the opposite direction to the rotational shaft 106 in the radial direction.

The connection portion 114 may define one surface of a motor accommodating portion 108, which will be described hereinafter, for example, one axial surface that faces the rotor 135 and the stator 137 of the motor 133 in the axial direction.

The flow path part 115 may include the inner wall 116, an outer wall 122, and the vane 123. The inner wall 116 may be formed in a cylindrical shape, for example, with a first diameter. One axial end of the inner wall 116 may be connected to the outer end of the connection portion 114. The axial direction of the inner wall 116 refers to a longitudinal direction of the inner wall 116. The inner wall 116 may define therein a motor accommodating portion 108 together with the connection portion 114.

The outer wall 122 may be radially spaced apart from an outer circumferential surface of the inner wall 116. The outer wall 122 may be formed in a cylindrical shape, for example, with a second diameter greater than the first diameter.

An upstream end of the outer wall 122 may be accommodated inside of the downstream end of the shroud 100. The upstream end of the outer wall 122 may be coupled to the downstream end of the shroud 100.

The outer wall 122 may further include the second fastening portion 126. The second fastening portion 126 may externally protrude from the upstream end of the outer wall 122 in the radial direction. The second fastening portion 126 may extend in the circumferential direction along the outer circumference of the outer wall 122. A plurality of second fastening holes may be formed through the second fastening portion 126 in the axial direction.

The plurality of second fastening holes of the second fastening portion 126 may be spaced apart from one another in the circumferential direction. The first fastening holes and the second fastening holes may overlap each other in the axial direction. A fastening member, such as a screw, may be fastened through the first fastening hole and the second fastening hole.

The outer wall 122 may define the appearance of the fan motor together with the shroud 100.

A flow path through which air flows may be defined between the outer wall 122 and the inner wall 116. The flow path part 115 may be disposed on the downstream side of the shroud 100. When the shroud 100 and the motor housing 110 are viewed in the axial direction, the flow path formed inside of the flow path part 115 may be disposed inside of the shroud 100.

Air suctioned by the impeller 130 may move along the flow path part 115 in the shroud 100. The flow of air moving along the flow path part 115 may be referred to as a main flow.

A plurality of vanes 123 may be disposed between the inner wall 116 and the outer wall 122. The vanes 123 may protrude from the outer circumferential surface of the inner wall 116 to an inner circumferential surface of the outer wall 122. A protruding direction of the vanes 123 may be inclined at a preset or predetermined angle with respect to the radial direction between the inner wall 116 and the outer wall 122.

One (first) radial end of the vane 123 may be connected to the outer circumferential surface of the inner wall 116. Another (second) radial end of the vane 123 may be connected to the inner circumferential surface of the outer wall 122.

The vane 123 may be, for example, formed in a curved shape to be inclined with respect to the axial direction along the outer circumferential surface of the inner wall 116 or the inner circumferential surface of the outer wall 122. A curvature of the vane 123 may differ along the axial direction. For example, the curvature of the vane 123 may increase from an upstream side to a downstream side of the flow path part 115.

With this structure, the vanes 123 guide the flow of air generated by the impeller 130 in one direction. For example, the plurality of vanes 123 may maintain a smooth flow of air by converting the rotational flow of air from the circumferential direction of the impeller 130 into the axial direction.

The vane 123 may be implemented as a one-stage vane 123 or an N-stage vane 123 (N is a natural number equal to or greater than 2). The one-stage vane means that one vane 123, namely, one integral vane 123 is formed along the outer circumferential surface of the inner wall 116 or the inner circumferential surface of the outer wall 122. The N-stage vane 123 mean that a plurality of vanes 123 is formed along the outer circumferential surface of the inner wall 116 or the inner circumferential surface of the outer wall 122 to be separated from one another in the axial direction.

In this embodiment, the vane is shown implemented as a two-stage vane 123. The two-stage vane 123 may be configured with a first vane 1231 disposed at the upstream side of the flow path part 115 and a second vane 1232 disposed at the downstream side of the flow path part 115.

The flow path part 115 refers to a portion where the vane 123 is formed. An axial length of the flow path part 115 may refer to an axial length of the vane 123.

The flow path part 115 may be divided into a first flow path part (flow path) and a second flow path part (flow path). The first flow path part may be disposed at an upstream side of the motor housing 110 based on the air flow direction. The vane 1231 may be disposed inside of the first flow path part.

The second flow path part may be disposed at a downstream side of a flow path housing, which will be described hereinafter, based on the air flow direction. The second vane 1232 may be disposed inside of the second flow path part.

A radial width of each of the first flow path part and the second path part may be constant or may be formed differently along the axial direction. This embodiment shows that the radial width W of the flow path part 115 is maintained constant.

A thickness of the inner wall 116 may be different along the axial direction. The inner wall 116 may be divided into a first inner wall portion 117 and a second inner wall portion 119 depending on a location of the flow path part 115. The first inner wall portion 117 may be disposed in the first flow path part. The second inner wall portion 119 may be disposed in the second flow path part. For example, a thickness of the first inner wall portion 117 may be thinner than a thickness of the second inner wall portion 119. A sum of the thickness of the first inner wall portion 117 and the thickness of a flow path inner wall portion 128 of a flow path housing 127, which will be described hereinafter, may be formed to correspond to the thickness of the second inner wall portion 119.

The motor housing 110 may further include the flow path housing 127. The flow path housing 127 may be disposed in the first flow path part. The flow path housing 127 may include a flow path inner wall portion 128, a flow path outer wall portion 129, and a first vane 1231.

The flow path inner wall portion 128 is formed in a cylindrical shape, for example. The flow path inner wall portion 128 may have an axial length corresponding to an axial length of the first inner wall portion 117. The flow path inner wall portion 128 may extend in the circumferential direction along an outer circumference of the first inner wall portion 117.

The flow path inner wall portion 128 may surround the outer circumferential surface of the first inner wall portion 117. The flow path inner wall portion 128 and the first inner wall portion 117 may be coupled to each other so that the inner circumferential surface of the flow path inner wall portion 128 and the outer circumferential surface of the first inner wall portion 117 come into contact with each other.

The outer circumferential surface of the flow path inner wall portion 128 and the outer circumferential surface of the second inner wall portion 119 may define the same surface along the longitudinal direction (axial direction) of the flow path inner wall portion 128 and the second inner wall portion 119. This may minimize the flow resistance of air.

A bent portion 1281 may be formed on an upstream end of the flow path inner wall portion 128 to be bent toward an outer circumferential portion of the connection portion 114. A concave groove 118 may be formed at an edge portion where the connection portion 114 and the first inner wall portion 117 are connected. The concave groove 118 may be formed to be concave radially inward from the outer circumferential portion of the connection portion 114.

With this structure, the bent portion 1281 may be coupled to the concave groove 118. The inner circumferential surface of the flow path inner wall portion 128 and the outer circumferential surface of the first inner wall portion 117 may be coupled to each other in close contact. The bent portion 1281 may be disposed adjacent to the downstream end of the hub 131, and the hub 131 and the bent portion 1281 may form a streamlined curved surface. Flow resistance may be minimized during the movement of air from the hub 131 to the bent portion 1281.

The flow path outer wall portion 129 is formed in a cylindrical shape, for example. The flow path outer wall portion 129 may have an axial length corresponding to the axial length of the flow path inner wall portion 128. The flow path outer wall portion 129 may be disposed to be spaced apart radially outward from the outer circumferential surface of the flow path inner wall portion 128 at a preset or predetermined gap.

The flow path outer wall portion 129 may extend in the circumferential direction along an outer circumference of the first vane 1231. A thickness of the flow path outer wall portion 129 is formed to be thinner than a thickness of the linear portion 104 of the shroud 100. The thickness of the flow path outer wall portion 129 may be formed to be thinner than the thickness of the outer wall 122.

The flow path outer wall portion 129 may be coupled to the inner circumferential surface of the linear portion 104 of the shroud 100. For this purpose, a coupling groove may be formed in the inner circumferential surface of the linear portion 104 to be concave radially outward. The coupling groove may extend in the circumferential direction along the inner circumference of the linear portion 104.

With this structure, the flow path outer wall portion 129 may be coupled to the coupling groove, thereby being restricted from moving in the second axial direction in which thrust acts. The flow path housing 127 may be supported by being coupled between the first inner wall portion 117 of the motor housing 110 and the linear portion 104 of the shroud 100.

An inner circumferential surface of the flow path outer wall portion 129 and an inner circumferential surface of the outer wall 122 may form the same surface along the longitudinal direction of the flow path outer wall portion 129 and the outer wall 122.

A plurality of the first vane 1231 may be disposed between the flow path inner wall portion 128 and the flow path outer wall portion 129. The plurality of first vanes 1231 may be spaced apart from one another in the circumferential direction along the outer circumferential surface of the flow path inner wall portion 128 or the inner circumferential surface of the flow path outer wall portion 129. The first vane 1231 may be connected to the flow path inner wall portion 128 at an inner side thereof, and connected to the flow path outer wall portion 129 at an outer side. The first vane 1231 may be formed in a curved shape to be inclined with respect to the axial direction along the outer circumferential surface of the flow path inner wall portion 128 or the inner circumferential surface of the flow path outer wall portion 129.

The flow path inner wall portion 128, the flow path outer wall portion 129, and the first vanes 1231 of the flow path housing 127 may define the first flow path part. he second inner wall portion 119, the outer wall 122, and the second vanes 1232 may define the second flow path part.

The outer wall 122 may be disposed on a downstream side of the flow path outer wall portion 129. The outer wall 122 may be disposed to be spaced apart from the outside of the second inner wall portion 119 at a preset or predetermined gap.

The outer wall portion 122 may extend in the axial direction longer than the second inner wall portion 119 with respect to an upstream end of the second flow path part. The upstream end of the second flow path part may refer to a portion forming the boundary between the first flow path part and the second flow path part. For example, the upstream end of the second flow path part may refer to a portion where the first vane 1231 and the second vane 1232 are coupled in close contact with each other.

The second fastening portion 126 may be formed to protrude radially outward from the upstream end of the outer wall 122. The second fastening portion 126 may extend in the circumferential direction along the outer circumference of the outer wall 122. The first fastening portion 106 and the second fastening portion 126 may be disposed to overlap each other in the axial direction.

A second fastening hole may be formed through the second fastening portion 126 in the axial direction. A plurality of the second fastening hole may be provided in the second fastening portion 126. The plurality of second fastening holes may be disposed to be spaced apart in the circumferential direction along the circumference of the second fastening portion 126. The second fastening holes may be disposed to overlap the first fastening holes in the axial direction.

With this structure, a fastening member, such as a screw may be coupled to the first fastening portion 106 and the second fastening portion 126 through the first fastening hole and the second fastening hole. The second fastening portion 126may be coupled to a downstream side of the first fastening portion 106. The shroud 100 and the motor housing 110 may be fastened by a plurality of fastening members.

A plurality of the second vane 1232may be disposed between the second inner wall portion 119 and the outer wall 122. The number of first vanes 1231 and the number of second vanes 1232 may be different from each other. The second vane 1232may be connected to the second inner wall portion 119 at an inner side thereof and connected to the outer wall 122 at an outer side.

The first flow path part and the second flow path part may be coupled in communication with each other in the axial direction.

A downstream end of the first vane 1231 and an upstream end of the second vane 1232 may be spaced apart from each other with a gap therebetween. Accordingly, air moving along the first vanes 1231 and air moving along the second vanes 1232 may smoothly flow continuously without interruption.

The motor accommodating portion 108may be disposed inside of the flow path part 115. The motor 133may be accommodated in the motor accommodating portion 108.

In order to support the motor 133, a support portion 141may be disposed in the motor accommodating portion 108. The support portion 141 may protrude radially inward from the inner circumferential surface of the inner wall 116. The support portion 141 may extend axially from the inner circumferential surface of the inner wall 116.

The support portion 141 may extend in the axial direction from the inner circumferential surface of the first inner wall portion 117. The support portion 141may be formed to surround the outer circumferential surface of a stator core 138, which will be described hereinafter. A block 142may be formed at an edge where the support portion 141 and the connection portion 114 are connected. The block 142 may have a trapezoidal cross-sectional shape based on a radial cross-section, for example. The block 142 may extend along the circumference of the connection portion 114 in the circumferential direction.

A first surface among cross sections of the block 142may be in contact with the connection portion 114. A second surface among the cross sections of the block 142may be in contact with the inner circumferential surface of the inner wall 116. Among the cross sections of the block 142, a third surface connecting the first surface and the support portion 141 may be inclined. Among the cross sections of the block 142, a fourth surface connecting the second and third surfaces may be integrally connected to one end of the support portion 141.

An axial length of the support portion 141 may be longer than an axial length of the stator core 138.

A plurality of the support portion 141may be provided on the inner circumferential surface of the inner wall 116. The plurality of support portions 141 may be spaced apart from one another in the circumferential direction along the inner circumferential surface of the inner wall 116. In this embodiment, three support portions 141 are disposed to be spaced apart at intervals of 120 degrees.

The motor 133 may include the rotational shaft 134, the rotor 135, and the stator 137. The rotational shaft 134may be disposed in the center of each of the shroud 100, the motor housing 110, and a second housing 146, which will be described hereinafter. The rotational shaft 134 may extends along a center line which passes through the centers of the shroud 100, the motor housing 110, and the second housing 146 in the axial direction.

A first bearing support portion to which the first bearing 112may be coupled may be formed on one (first) side of the rotational shaft 134. A second bearing support portion to which the second bearing 147may be coupled may be formed on another (second) side of the rotational shaft 134.

The rotor 135may be disposed between the first bearing support portion and the second bearing support portion. A rotor support portion may be disposed between the first bearing support portion and the second bearing support portion. The rotor 135 may include a permanent magnet 136. The rotor 135 may optionally further include a rotor core.

The permanent magnet 136 may be coupled to the rotational shaft 134 or to the rotor core. In this embodiment, the rotor core may be omitted to miniaturize the motor 117, and the permanent magnet may be shown coupled to the rotor support portion of the rotational shaft 134.

The stator 137 may be configured to surround the rotor 135, for example, the permanent magnet 136. The stator 137 and the permanent magnet 136 may be spaced apart from each other with a preset or predetermined air gap.

The stator 137 may include the stator core 138 and a stator coil 139. The stator core 138 may include a back yoke, a plurality of teeth, and a plurality of slots. The back yoke may be formed in a cylindrical shape, for example.

The plurality of teeth may protrude radially inward from an inner circumferential surface of the back yoke toward the rotational shaft 134. The plurality of teeth 121 may be spaced apart from one another in the circumferential direction along the inner circumferential surface of the back yoke. Each slot may be formed between two teeth 121 adjacent to each other in the circumferential direction.

The slot may be formed through the stator core 138 in the axial direction. The plurality of teeth and the plurality of slots may be alternately disposed in the circumferential direction.

The stator coil 139 may be configured as a plurality of three-phase coils. The stator coil 139 may be wound on the tooth. An insulator 140 may be disposed for electrical insulation between the stator coil 139 and the stator core 138.

The slot formed between the teeth around which the stator coil 139 may be wound may define an internal flow path for cooling the motor. Air may flow through the internal flow paths to cool the motor 133.

A lead wire 154 that applies power to one side of the stator coil 139 may extend in the axial direction. The lead wire 154 may receive external power through a power source connector 155, which will be described hereinafter.

With this configuration, when power, such as alternating current (AC), is applied to the stator coil 139, a magnetic field is generated around the stator coil 139. The rotor 135 rotates relative to the stator 137 by electromagnetic interaction between the rotor 135 and the stator 137. The permanent magnet and the rotational shaft 134 rotate together to generate a rotational force.

The impeller 130 coupled to one side of the rotational shaft 134 rotates by the rotational force transmitted through the rotational shaft 134.

The stator core 138 may be, for example, press-fitted to the plurality of support portions 141. With this structure, the plurality of support portions 141 may support the stator 137.

A motor seating portion 143 may be disposed in the inner surface of the support portion 141. The motor seating portion 143 may be formed radially concave in the inner surface of the support portion 141, for example. A circumferential width of the support portion 141 may be smaller than a gap between the plurality of support portions 141 adjacent to each other. The inner surface of the motor seating portion 143 may be formed in a curved shape with a curvature corresponding to the outer circumferential surface of the stator core 138, for example.

With this structure, the motor seating portion 143 may be in surface contact with the outer circumferential surface of the stator core 138 while surrounding the same. An alignment groove 144 may be formed in one axial end of the motor seating portion 143, for example, in an upstream end of the motor seating portion 143. The alignment groove 144 may be formed to align a position of the stator core 138 in the axial direction.

The alignment groove 144 may be formed to be concave radially outward from the inner surface of the support portion 141, for example. The alignment groove 144 may define a radial step surface at a boundary between the support portion 141 and the motor seating portion 143. The alignment groove 144 may cover a portion of one axial end of the stator core 138.

With this structure, when the stator core 138 is press-fitted between the plurality of support portions 141, one axial end of the stator core 138 may be caught by the alignment groove 144. The alignment groove 144 may restrict the stator core 138 from moving in the axial direction in the coupled state to the support portion 141. Accordingly, the position of the stator core 138 to be coupled may be aligned by the alignment groove 144.

An alignment guide 145 may further be disposed inside of the motor seating portion 143. The alignment guide 145 may protrude radially inward from the inner circumferential surface of the motor seating portion 143 toward the rotational shaft 134.

The alignment guide 145 may have an arcuate cross-sectional shape, for example. The alignment guide 145 may extend along the axial direction from an inner circumferential surface of the motor seating portion 143. A circumferential width of the alignment guide 145 may be smaller than a circumferential width of the motor seating portion 143. An axial center line passing through a center of the alignment guide 145 in the axial direction may be disposed to match an axial center line passing through a center of the motor seating portion 143 in the axial direction. With this structure, the alignment guide 145 may concentrically align the center of the stator core 138 and the center of the support portion 141 of the motor housing 110 along the axial direction.

The second housing 146 may be disposed at a downstream side of the motor housing 110. The second housing 146 may include a second bearing housing 148, a bridge 152, and a coupling portion 150. The second bearing 147 may be accommodated in the second bearing housing 148. The second bearing housing 148 may be formed in a cylindrical shape, for example. The second bearing housing 148 may extend along the circumferential direction to surround the outer circumferential surface of the second bearing 147.

A second stopper 149 may protrude radially inward from one axial end of the second bearing housing 148. The one axial end of the second bearing housing 148 refers to one end of the first axial direction, based on the air flow direction, of both axial ends of the second bearing housing 148. With this structure, the second stopper 149 may restrict movement of the second bearing 147 in the first axial direction while the second bearing 108 may be accommodated in the second bearing housing 148.

The bridge 152 may extend in the radial direction from the outer circumferential surface of the second bearing housing 148 toward an inner surface of the coupling portion 150, which will be described hereinafter. A plurality of the bridge 152 may be provided. The plurality of bridges 152 may be spaced apart from one another in the circumferential direction along the outer circumference of the second bearing housing 148. With this structure, the bridges 152 may connect the second bearing housing 148 and the coupling portion 150.

The coupling portion 150 may be coupled to a downstream end of the support portion 141. The coupling portion 150 may be disposed to surround the downstream end of the support portion 141. For example, a support portion accommodating groove 151 may be formed concave in the axial direction in one axial end of the coupling portion 150.

The support portion accommodating groove 151 may include a first surface, a second surface, and a third surface. The first surface of the support portion accommodating groove 151 may be a surface that faces the downstream end of the support portion 141 in the axial direction. The second surface of the support portion accommodating groove 151 may extend in the axial direction from one end of the first surface to face one of two side surfaces of the support portion 141, which are opposite in the circumferential direction. The third surface of the support portion accommodating groove 151 may be disposed to face the other side surface of the two side surfaces of the support portion 141, which are opposite in the circumferential direction.

The downstream end of the support portion 141 may be inserted into the support portion accommodating groove 151 of the coupling portion 150. Optionally, the support portion 141 and the coupling portion 150 may be fastened using a fastening member, such as a screw.

A controller may be disposed on a downstream side of the second housing 146. The controller may be configured to control an overall operation of the fan motor, such as the motor 133. The controller may include a printed circuit board (PCB) 153, an insulated-gate bipolar transistor (IGBT), and a capacitor, for example.

A power source connector 155 may be disposed on the printed circuit board 153. The power source connector 155 may protrude from the printed circuit board 153 to be connectable to the lead wire 154. A plurality of the power source connector 155 may be provided to correspond to the lead wires 154. The power source connector 155 may be connected to an external power source. With this structure, external power may be applied to the stator coil 139 through the power source connector 155 and the lead wire 154.

Hereinafter, a movement path of air will be described.

When the rotational shaft 134 of the motor 133 rotates, air may be suctioned into the shroud 100 through the suction port 101 by the rotation of the impeller 130. Next, the air may pass through the flow path between the shroud 100 and the impeller 130.

Subsequently, the air passed through the impeller 130 flows into the vane 123 of the flow path part 115. The air then passes through the first vane 1231 of the first flow path part and the second vane 1232 of the second flow path part. The air guided by the first vane 1231 may move in the axial direction along the outer circumferential surface of the flow path inner wall portion 128 and the inner circumferential surface of the flow path outer wall portion 129. The air guided by the second vane 1232 may move in the axial direction along the outer circumferential surface of the second inner wall portion 119 and the inner circumferential surface of the outer wall 122.

A portion of the air that has passed through the first vane 1231 of the first flow path part and the second vane 1232 of the second flow path part may be discharged toward the stator 137. The portion of the air may be in contact with the outer circumferential surface of the stator core 138 to cool heat generated from the stator core 138.

In order to cool heat generated from the stator core 138 as quickly as possible, it may be necessary to secure a larger contact area between air and the stator coil 139 and the outer circumferential surface of the stator core 138. For example, in order to increase the cooling performance of the stator coil 139, a greater flow rate of air flowing into the motor accommodating portion 108 has to be secured. This is because heat generated from the stator coil 139 exposed to the motor accommodating portion 108 in the slot of the stator core 138 may be more absorbed when more air is accommodated in the motor accommodating portion 108. Thus, a distance by which the stator is spaced axially apart from the inner surface of the connection portion 114 of the motor housing 110 may correspond to a distance by which an outlet end of the inner wall 116 is spaced axially apart from the inner surface of the connection portion 114.

An upstream end of the stator coil 139 exposed from the slot to the motor accommodating portion 108 may be disposed to radially overlap at least one of the outlet end of the inner wall 116, the opening 120 formed in the outlet end of the inner wall 116, and the vane extension portion 124 and the vane protrusion portion 125 described hereinafter. In this embodiment, the upstream end of the stator coil 139 is shown overlapping the opening 120, the vane extension portion 124, and the vane protrusion portion 125 in the radial direction. With this structure, air guided by the vane extension portion 124 and the vane protrusion portion 125 may be induced to the stator coil 139 through the opening 120, thus to efficiently cool the stator coil 139.

In order to increase the cooling performance of the stator core 138, the outer circumferential surface of the stator core 138 may be exposed as much as possible toward the outside of the outer wall 122. For this purpose, a distance between the inner surface of the connection portion 114 forming one surface of the motor accommodating portion 108 and the upstream end of the stator core 138 may be equal to or greater than a distance between the inner surface of the connection portion 114 and a downstream end of the outer wall 122. The upstream and downstream sides are based on the air flow direction. The downstream end of the outer wall 122 refers to the outlet end of the outer wall 122 through which air may be discharged from the flow path part 115.

In this embodiment, the distance between the inner surface of the connection portion 114 and the upstream end of the stator core 138 may be equal to the distance between the inner surface of the connection portion 114 and the downstream end of the outer wall 122. If the axial distance between the inner surface of the connection portion 114 and the upstream end of the stator core 138 is smaller than the axial distance between the inner surface of the connection portion 114 and the downstream end of the outer wall 122, the outer circumferential surface of the stator core 138 is obscured by the outer wall 122 and an area exposed to the outside of the outer wall 122 is reduced, thereby causing reduction of a contact area between the stator core 138 and air. As a result, the heat dissipation performance of the stator core 138 may deteriorate.

In addition, if the distance between the inner surface of the connection portion 114 and the upstream end of the stator core 138 is excessively greater than the distance between the inner surface of the connection portion 114 and the downstream end of the outer wall 122, a length of the rotational shaft 134 may increase, causing vibration and noise in the rotational shaft 134 while the rotational shaft 134 rotates at high speed. Additionally, as the axial length of the fan motor increases, this may have a negative effect on miniaturization of the fan motor.

The outer circumferential surface of the stator core 138 and the inner circumferential surface of the inner wall 116 may have a preset or predetermined radial gap. If the radial gap between the outer circumferential surface of the stator core 138 and the inner circumferential surface of the inner wall 116 is too large, air that has passed through the vane 123 may be dispersed in the radial direction and a quantity of air that is in contact with the outer circumferential surface of the stator core 138 is reduced. On the other hand, if the radial gap between the outer circumferential surface of the stator core 138 and the inner circumferential surface of the inner wall 116 is too small, a flow rate of air, which moves from the outlet end of the inner wall 116 to the stator 137 may be drastically reduced or the movement of air may be blocked.

Therefore, the radial gap between the outer circumferential surface of the stator core 138 and the inner circumferential surface of the inner wall 116 must be appropriately maintained. For example, the radial gap between the outer circumferential surface of the stator core 138 and the inner circumferential surface of the inner wall 116 may be 1T to 2T compared to the thickness T of the inner wall 116.

When the impeller 130 rotates at high speed, for example, at 10,000 rpm to 14,000 rpm, the speed of air discharged from the outlet end of the vane 123 in the axial direction along the outer circumferential surface of the stator core 138 increases. According to Bernoulli's theorem, as the flow rate of air increases, pressure decreases. Pressure on the outer circumferential surface of the stator core 138 decreases.

Accordingly, air contained in the motor accommodating portion 108 may be suctioned to the outside of the stator core 138 by low pressure. Air heated by heat exchange with the stator coil 139, the first bearing, the rotational shaft, and the permanent magnet escapes to the outside of the stator core 138, so that the air may be recirculated.

That is, some of air moving in the first axial direction along the outer circumferential surface of the stator core 138 may be re-introduced into the internal flow path of the motor 133 at a downstream end of the motor 133 and move in the second axial direction opposite to the first axial direction, to be re-circulated to an upstream end of the motor 133. According to the flow of air as described above, as the air that cools the motor 133 circulates without remaining in the motor accommodating portion 108, cooling air may be replaced with new air flowing in from the outside of the motor housing 110, thereby improving the cooling performance of the motor 133.

Another portion of the air that has passed through the first vane 1231 of the first flow path part and the second vane 1232 of the second flow path part may move into the motor accommodating portion 108. The air flowing into the motor accommodating portion 108 may cool heat generated from the stator coil 139, the permanent magnet 136, and the bearings.

An axial length of the second inner wall portion 119 may be shorter than an axial length of the outer wall 122 based on the upstream end of the second flow path part where the second vane 1232 is formed. Accordingly, the outer wall 122 of the second flow path part may be closed with respect to the radial outside, and the opening 120 may be formed in a downstream end of the second inner wall portion 119 of the second flow path part. The opening 120 may be open toward the inside of the motor accommodating portion 108. An axial height of the opening 120 refers to a difference between the axial length of the outer wall 122 and the axial length of the second inner wall portion 119. With this structure, some of air that has passed through the second vane 1232 of the second flow path part may move to the inside of the motor accommodating portion 108 through the opening 120 of the second inner wall portion 119.

The opening 120 may be formed to penetrate radially inward at a downstream end of the second inner wall portion 119. The opening 120 may extend in the circumferential direction along the outer circumference of the first inner wall portion 119.

The opening 120 may be divided into a plurality of inlets 121 by the vane extension portions 124 or the vane protrusion portions 125, which will be described hereinafter. The plurality of inlets 121 may be disposed to be spaced apart in the circumferential direction. With this structure, the plurality of inlets 121 may serve as passages through which air passed through the flow path part 115 moves radially inward toward the motor accommodating portion 108.

A height of the opening 120 may be 10 to 50% of an axial length of the flow path part 115. In this embodiment, the axial length of the flow path part 115 may mean a sum of axial lengths of the flow path outer wall portion 129 and the outer wall 122.

If the height of the opening 120 is less than 10% of the axial length of the flow path part 115, the flow resistance and flow loss of air moving from the flow path part 115 to the motor accommodating portion 108 increase and a quantity of air moving to the motor accommodating portion 108 decreases. On the other hand, when the height of the opening 120 exceeds 50% of the axial length of the flow path part 115, the cooling performance of the motor 133 may increase by virtue of the increase in the flow rate of air moving to the motor accommodating portion 108 but the suction performance of the impeller 130 may be reduced.

In order to minimize the flow loss of air moving inside of the motor accommodating portion 108, a vane extension portion 124 extending from the second vane 1232 may be further included. The vane extension portion 124 may be formed integrally with the second vane 1232. A plurality of the vane extension portion 124 may be provided to correspond to the second vanes 1232.

The vane extension portion 124 may be configured to change the flow direction of air guided by the vane 123 from the axial direction to the radial direction. In the case of a one-stage vane, the vane extension portion 124 may form a portion of the vane 323 (see FIG. 12). The one-stage vane refers to an integral vane that extends without being separated in the axial direction.

In the case of a two-stage vane, the vane extension portion 124 may form a portion of the second vane 1232. The two-stage vane refers to two vanes 123 that are separated from each other in the axial direction and disposed continuously in the axial direction. However, if the vane 123 extends axially between the inner wall 116 and the outer wall 122, the vane extension portion 124 extends radially from a downstream end of the vane 123.

The vane extension portion 124 may be formed to cover the downstream end of the second inner wall portion 119. The vane extension portion 124 may extend axially from the second vane 1232 more than the downstream end 1232 of the second inner wall portion 119. The vane extension portion 124 may further extend in the radial direction from a downstream end of the second vane 1232 to cover at least a portion of the thickness surface of the downstream end of the second inner wall portion 119.

The thickness surface of the second inner wall portion 119 may be formed between the outer circumferential surface and the inner circumferential surface of the second inner wall portion 119. The downstream end of the second inner wall portion 119 refers to the axial end of the second inner wall portion 119 based on the flow direction of air, which flows in the axial direction along the outer circumferential surface of the second inner wall portion 119.

In this embodiment, the vane extension portion 124 is formed to cover the entire thickness surface of the downstream end of the second inner wall portion 119. That is, the vane extension portion 124 may extend up to the inner circumferential surface of the inner wall 116.

According to this configuration, the vane extension portion 124 may guide a portion of air that has passed through the second vane 1232 to the motor accommodating portion 108. Axial through-holes may be formed to penetrate in the axial direction between the plurality of second vanes 1232 adjacent to each other in the circumferential direction.

Inlets may be formed to penetrate in the radial direction between the plurality of vane extension portions 124 adjacent to each other in the circumferential direction. The plurality of vane extension portions 124 may change the flow direction of air, which has passed through the second vane 1232 through the axial through-hole into the radial inward direction to guide the air to the inside of the motor accommodating portion 108.

The plurality of vane extension portions 124 may maintain the air flow smoothly without interruption while minimizing flow loss due to air vortex generated at a downstream end of the inner wall 116 when changing the flow of air from the axial direction to the radial direction. This may increase the quantity of air supplied into the motor accommodating portion 108, thereby improving the cooling performance of the motor 133.

Further, the vane extension portion 124 may minimize noise occurring when air flows during the rotation of the impeller 130 at high speed. Furthermore, the vane extension portion 124 may extend radially from the downstream end of the second vane 1232, which may enhance flow efficiency while maintaining a simple structure.

In order to minimize the flow loss of air moving into the motor accommodating portion 108, a vane protrusion portion 125 may further be included that protrudes from the vane extension portion 124 to the inside of the second inner wall portion 119 toward the motor accommodating portion 108. The vane extension portion 124 and the vane protrusion portion 125 may be the same or similar in that they minimize the flow loss of air moving into the motor accommodating portion 108. However, as the vane protrusion portion 125 protrudes closer to the outer circumferential surface of the stator 137 than the vane extension portion 124, the flow of air may be guided such that the air may be sprayed directly onto the outer circumferential surface of the stator 137.

The plurality of vane extension portions 124 and the plurality of vane protrusion portions 125 may evenly disperse air, which moves radially inward toward the stator 137, through the plurality of inlets, so that the air may be evenly distributed along the outer circumference of the stator 137 in the circumferential direction.

A radial width W of the flow path part 115 may have a ratio of 3 to 11% of a diameter D of the outer wall of the flow path part 115. The radial width W of the flow path part 115 refers to a radial width between the outer circumferential surface of the inner wall 116 and the inner circumferential surface of the outer wall 122. The radial width W of the flow path part 115 may be understood as the same concept as the radial width of the vane 123.

If the radial width of the vane 123 is less than 3% of the diameter D of the outer wall, there is a problem in that the flow resistance increases because the width of the flow path is too narrow. If the radial width of the vane 123 exceeds 11% of the diameter D of the outer wall, a space between the outer circumferential surface of the stator core 138 and the inner circumferential surface of the inner wall 116 becomes too small and thereby the flow rate of air moving toward the motor accommodating portion 108 decreases, thereby deteriorating the cooling performance of the motor.

The axial length of the flow path part 115 may have a ratio of 25 to 50% of the diameter D of the outer wall of the flow path part 115. The axial length of the flow path part 115 may mean the sum of the axial lengths of the flow path outer wall portion 129 and the outer wall 122.

If the axial length of the flow path part 115 is less than 25% of the diameter D of the outer wall, a distance by which air moves along the vane 123 is shortened, causing an increase in flow resistance. If the axial length of the flow path part 115 exceeds 50% of the diameter D of the outer wall, the flow rate of air that is trapped in the motor accommodating portion 108 by the outer wall 122 increases, causing deterioration of the cooling performance of the motor.

Figure 9A:
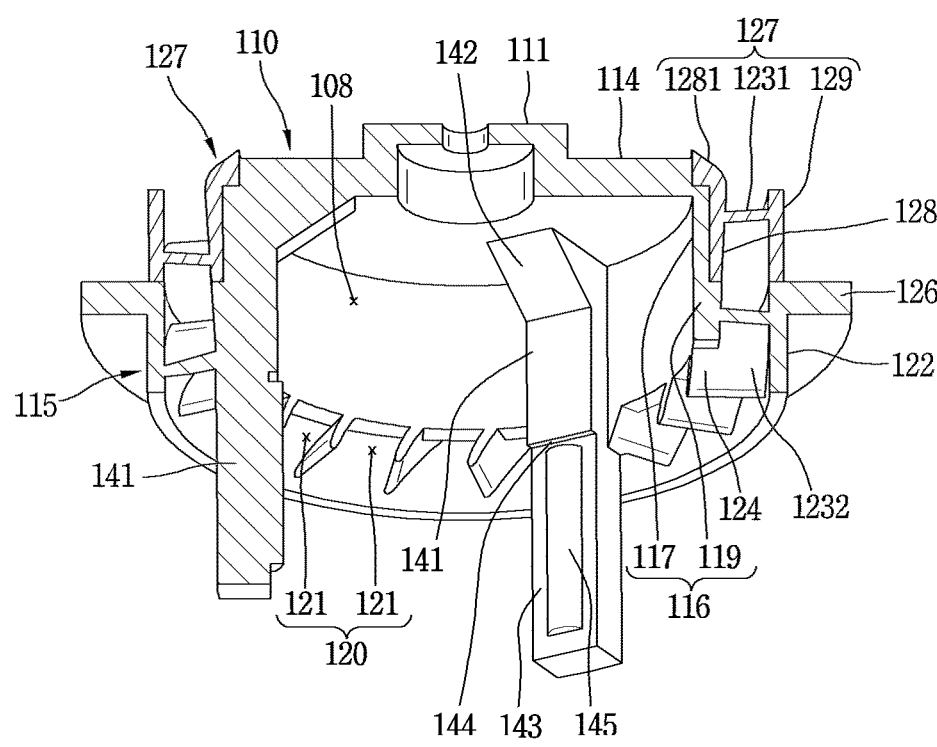
FIGS. 9A-9B are conceptual views of a vane extension portion radially extending from a vane of a motor housing according to another embodiment, where
Figure 9B:
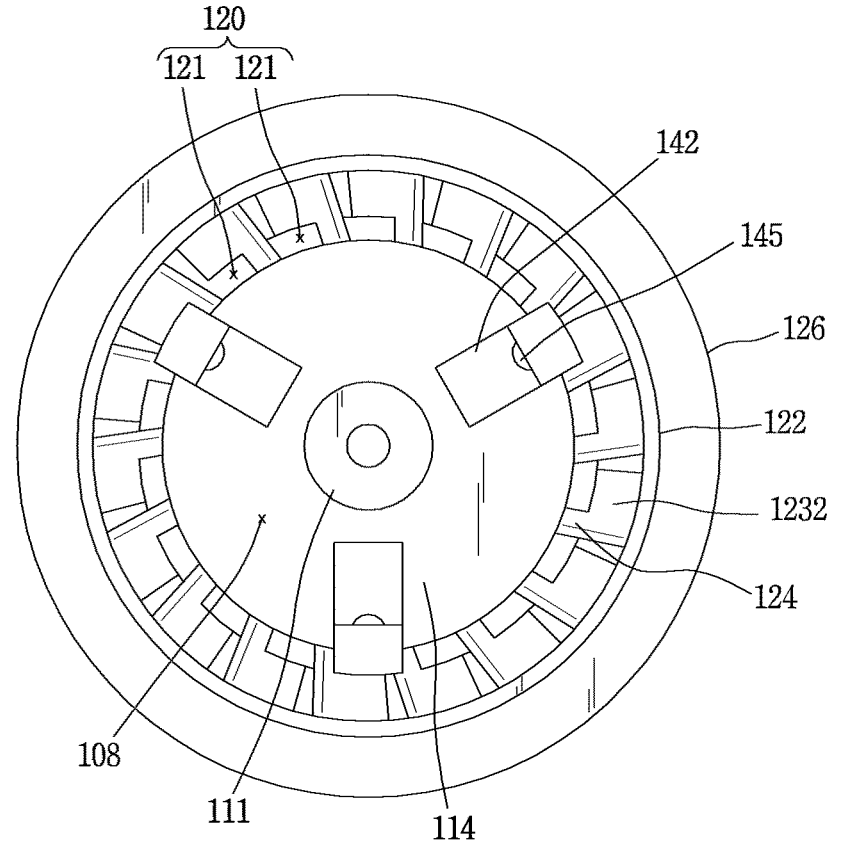

FIGS. 9A-9B are conceptual views illustrating that the vane protrusion portion extends in the radial direction from the vane of the motor housing according to another embodiment. FIG. 9A is a cross-sectional view of a radial cross-section of the motor housing. FIG. 9B is a conceptual view of the motor housing viewed in the axial direction.

This embodiment is different from the embodiment of FIGS. 1 to 8 in that vane extension portion 124 extends from a downstream end of vane 123 up to an inner circumferential surface of inner wall 116 and vane protrusion portion 125 is omitted. If the vane extension portion 124 extends from the downstream end of the vane 123 up to the inner circumferential surface of the inner wall 116 and the vane protrusion portion 125 is omitted, manufacturing difficulty as well as manufacturing cost may be reduced. As other components are the same as or similar to those in the previous embodiment of FIGS. 1 to 8, a redundant description will be omitted.

Figure 10:
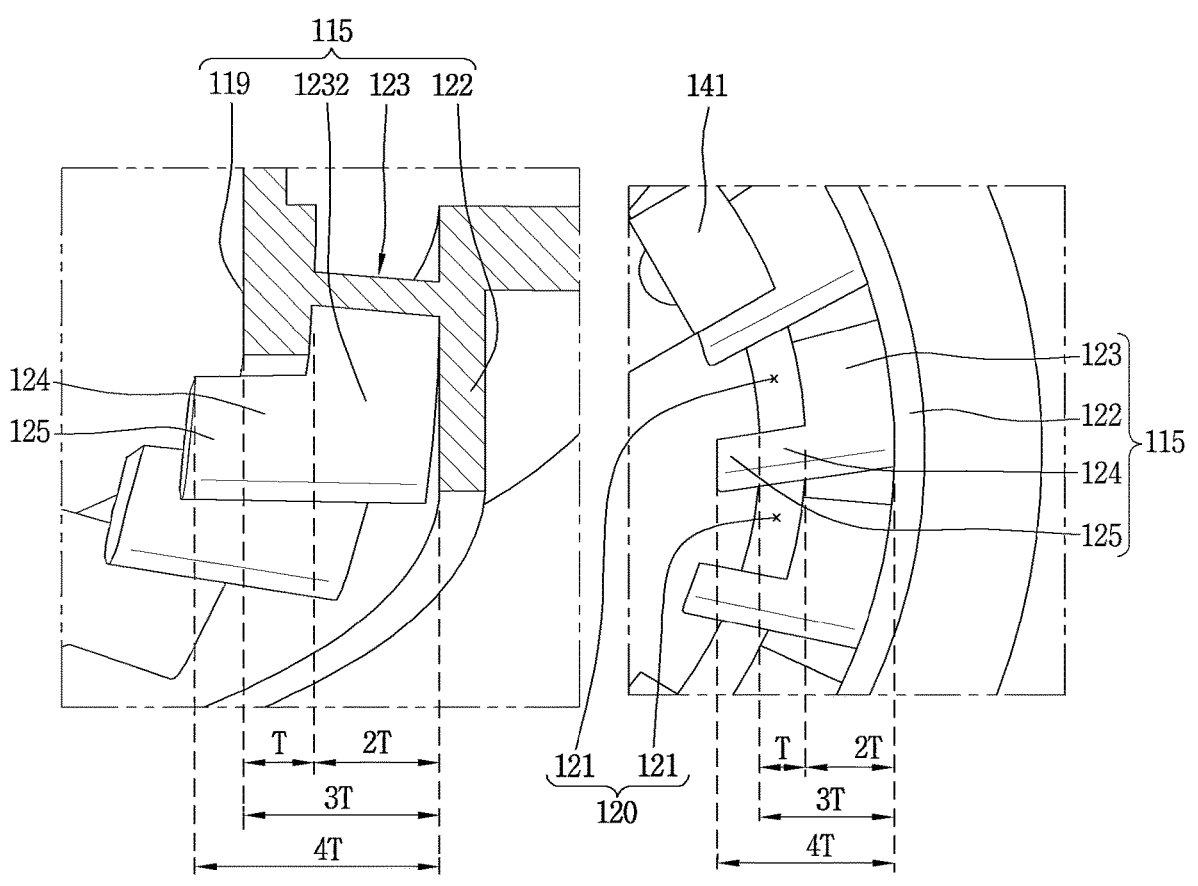
FIG. 10 is a conceptual view for comparing and explaining lengths of an inner wall, a vane extension portion, and a vane protrusion portion extending from the vane of a motor housing according to an embodiment.

FIG. 10 is a conceptual view for comparing and explaining lengths of the inner wall, the vane extension portion, and the vane protrusion portion extending from the vane of the motor housing according to embodiments.

The flow path part 115 according to embodiments may include the vane extension portion 124 extending from the second vane 1232. Optionally, the vane protrusion portion 125 may extend radially from the vane extension portion 124 so as to protrude to the inside of the inner wall 116.

When the thickness of the second inner wall portion 119 is T mm, the radial width of the first vane 1231 or the second vane 1232 may be one to three times (1T to 3T) the thickness of the second inner wall portion 119. When the radial width of the second vane 1232 is 2T, the sum of the radial width of the second vane 1232 and the length of the vane extension portion 124 may be 3 times, namely, 3T the thickness of the second inner wall portion 119.

The sum of the radial width of the second vane 1232 and the lengths of the vane extension portion 124 and the vane protrusion portion 125 may be 4 times, namely, 4T the thickness of the second inner wall portion 119. A radial length of the vane protrusion portion 125 may further protrude by one to two times, namely, 1T to 2T the thickness of the inner wall 116 based on the inner circumferential surface of the inner wall 116.

Figure 11:
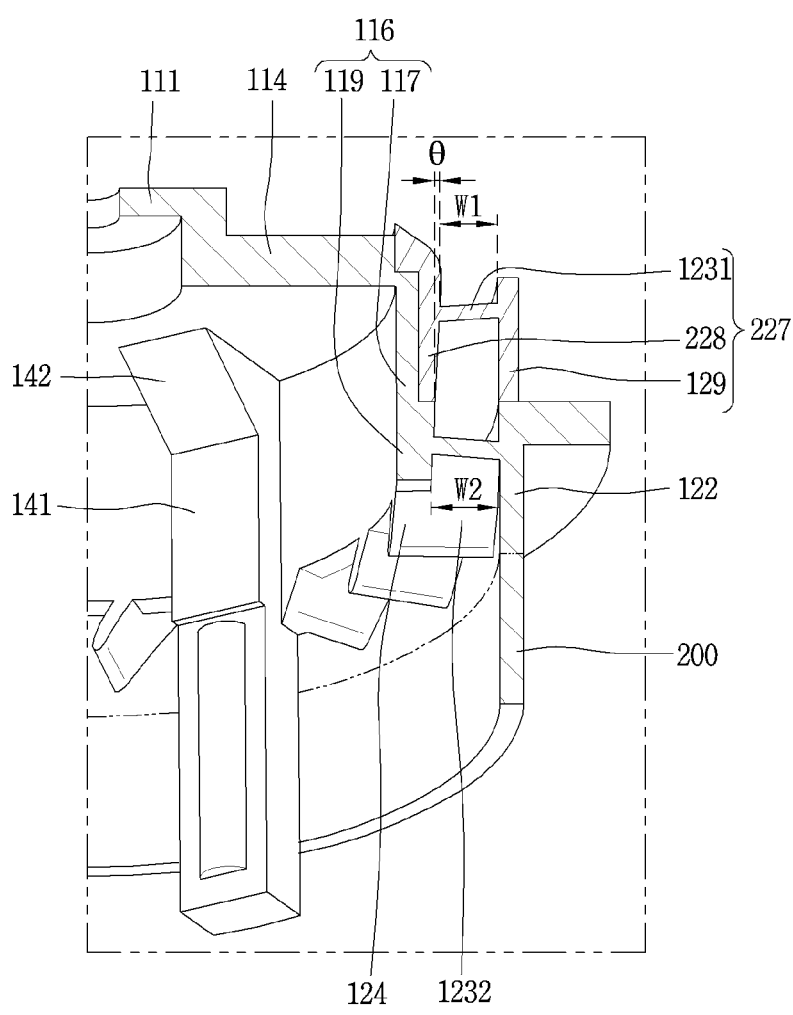
FIG. 11 is a conceptual view of a structure in which a width of a flow path part is expanded in a two-stage vane and a housing extension portion axially extends from a motor housing according to still another embodiment.

FIG. 11 is a conceptual view of a structure in which a width of the flow path part is expanded from an upstream side to a downstream side in a two-stage vane and a housing extension portion axially extends from the outer wall of the motor housing 0 according to still another embodiment.

This embodiment is different from the embodiments of FIGS. 1 to 10 in that a radial flow path width of flow path part 115 is expanded from the upstream side to the downstream side and housing extension portion 200 extends further in the axial direction from motor housing 110.

A thickness of flow path inner wall portion 228 of flow path housing 227 may vary along the axial direction. A thickness of flow path inner wall portion 228 may be defined between an outer circumferential surface and an inner circumferential surface of the flow path inner wall portion 228. The inner circumferential surface of the flow path inner wall portion 228 may extend vertically along the axial direction. The outer circumferential surface of the flow path inner wall portion 228 may be inclined at a preset or predetermined angle θ with respect to the axial direction.

For example, a thickness of an upstream end of the flow path inner wall portion 228 may be greater than a thickness of a downstream end of the flow path inner wall portion 228. The thickness of the flow path outer wall portion 129 may be defined between an outer circumferential surface and an inner circumferential surface of the flow path outer wall portion 129. The thickness of the flow path outer wall portion 129 may be constant along the axial direction.

A radial flow path width of the first flow path part may increase from the upstream side to the downstream side. A radial width of vane 123 may increase from the upstream side to the downstream side of the flow path part 115. A radial width W1 of the upstream side of the vane 123 may be smaller than a radial width W2 of the downstream side of the vane 123. A thickness of the second inner wall portion 119 of the second flow path part may differ along the axial direction. The thickness of the second inner wall portion 119 corresponds to a distance between an outer circumferential surface and an inner circumferential surface of the second inner wall portion 119. The inner circumferential surface of the second inner wall portion 119 may extend vertically along the axial direction. The outer circumferential surface of the second inner wall portion 119 may be inclined at a preset or predetermined angle θ with respect to the axial direction.

For example, a thickness of an upstream end of the second inner wall portion 119 may be greater than a thickness of the downstream end of the second inner wall portion 119. A thickness of outer wall 122 corresponds to a distance between an outer circumferential surface and an inner circumferential surface of the outer wall 122. The thickness of the outer wall 122 may be constant along the axial direction.

The inner circumferential surface of the flow path outer wall portion 129 and the inner circumferential surface of the outer wall 122 may be flush with each other along the axial direction (longitudinal direction). The radial flow path width of the second flow path part may increase from the upstream side to the downstream side.

With this configuration, the radial flow path width of the flow path part 115 may increase from the upstream side to the downstream side, thereby increasing the flow rate of air moving into the motor accommodating portion 108. The flow of air within the flow path part 115 may be maintained stably. This may improve the cooling performance of the motor.

A portion of the motor housing 110 may extend further in the axial direction. The housing extension portion 200 may extend further in the axial direction from the outer wall 122 of the motor housing 110. With this structure, the housing extension portion 200 may provide an additional cooling effect without reducing flow efficiency.

The housing extension portion 200 may trap more air, which has passed through the second flow path part, inside of the outer wall 122 of the motor housing 110, thereby increasing the flow rate of air moving into the motor housing 108 and also increasing the flow rate of air moving toward an outer circumferential surface of the stator core 138. Additionally, the housing extension portion 200 may improve a straightness of the flow of air that has passed through the second flow path part.

A length of the housing extension portion 200 may be in a range of 25% to 55% of the axial length of the flow path part 115. If the length of the housing extension portion 200 is less than 25% of the axial length of the flow path part 115, there is a problem in that the effect of improving the straightness of the flow of air passed through the flow path part 115 is reduced. If the length of the housing extension portion 200 exceeds 55% of the axial length of the flow path part 115, the quantity of air flowing in from the outside of the motor 133 is reduced, causing a problem that the cooling performance of the motor 133 is reduced.

The housing extension portion 200 may be applied to the fan motor separately from the vane extension portion 124 and the vane protrusion portion 125 according to the embodiments of FIGS. 1 to 10. For example, only the housing extension portion 200 may be applied to the fan motor or may be applied to the fan motor together with the vane extension portion 124 and the vane protrusion portion 125.

As other components are the same as or similar to those in the embodiments of FIGS. 1 to 9, redundant description has been omitted.

Figure 12:
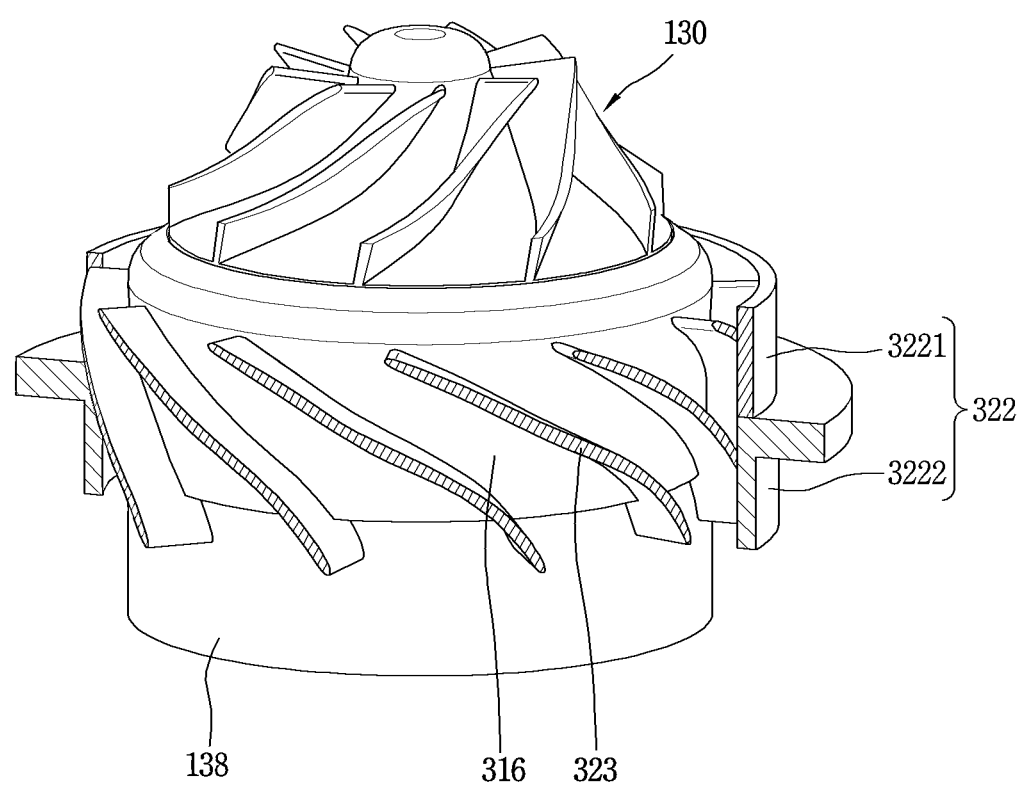
FIG. 12 is a conceptual view of a one-stage vane structure according to still another embodiment.

FIG. 12 is a conceptual view of a one-stage vane structure according to still another embodiment. This embodiment is different from the previous embodiments of FIGS. 1 to 11 in that the vane 323 is configured as a one-stage vane 323.

A plurality of the one-stage vane 323 may be provided inside of flow path part 315. The flow path part 315 may include an inner wall 316 and an outer wall 322. The inner wall 316 may be formed in a cylindrical shape, for example. The inner circumferential surface of the inner wall 316 may define the motor accommodating portion 108. The inner wall 316 may be disposed to be separable into two pieces along the axial direction or may be provided as one integral wall.

When the inner wall 316 is disposed to be separable into two pieces, a first inner wall portion may be disposed on an upstream side of the flow path part 315, and the second inner wall portion may be disposed on a downstream side of the flow path part 315. The first inner wall portion and the second inner wall portion may each be formed in a cylindrical shape, for example. The first inner wall portion and the second inner wall portion may extend in the axial direction to be coupled to each other.

In this embodiment, it is shown that the inner wall 316 is formed in an integral cylindrical shape. When the inner wall 316 is provided as one integral form, it may be formed in a cylindrical shape.

The outer wall 322 may be formed in a cylindrical shape, for example. The outer wall 322 may be disposed radially outward at a preset or predetermined distance from the inner wall 316. The outer wall 322 may be disposed to be separable into two pieces along the axial direction or may be provided as one integral wall.

In this embodiment, it is shown that the outer wall 322 is disposed to be separable into two pieces. The outer wall 322 may include a first outer wall portion 3221 and a second outer wall portion 3222. The first outer wall portion 3221 may be located at the upstream side of the flow path part 315 and the second outer wall portion 3222 may be disposed at the downstream side of the flow path part 315.

The vane 323 may be formed in a curved shape to be inclined with respect to the axial direction along the outer circumferential surface of the inner wall 316. The vane 323 may be formed in a curved shape to be inclined with respect to the axial direction along the inner circumferential surfaces of the first outer wall portion 3221 and the second outer wall portion 3222. The curvature and curved direction of the vane 323 may vary along the axial direction.

As other components are the same as or similar to those in the embodiments of FIGS. 1 to 11, redundant description has been omitted.

Embodiments disclosed herein also provide a fan motor having structure that is capable of improving cooling performance of the motor while minimizing flow loss.

Embodiments disclosed herein further provide a fan motor having structure that is capable of enhancing flow efficiency while simplifying the structure of a vane.

Embodiments disclosed herein furthermore provide a fan motor that is capable of improving the cooling effect of the motor without a reduction of flow efficiency.

Embodiments disclosed herein provide a fan motor that may include a shroud; an impeller that is accommodated inside of the shroud and mounted to be rotatable around a rotational shaft; a motor that may include a rotor connected to the rotational shaft and a stator surrounding the rotor; and a motor housing that is coupled to a downstream end of the shroud based on a flow direction of air suctioned into the shroud by the impeller. The motor housing may include an outer wall, an inner wall, a vane, and a vane extension portion. The outer wall may define an appearance of the fan motor together with the shroud. The outer wall may be coupled to the shroud. The inner wall may be disposed inside of the outer wall toward the rotational shaft. The inner wall may accommodate the motor. The vane may be formed to protrude from an inner circumferential surface of the outer wall to an outer circumferential surface of the inner wall.

The vane extension portion may extend from a downstream end of the vane toward the rotational shaft based on the flow direction of air. The vane extension portion may cover at least a portion of a thickness surface between the outer circumferential surface and the inner circumferential surface of the inner wall. With this structure, the vane extension portion may minimize flow loss of air when some of air that has passed through the vane moves to the inside of the inner wall. The air flowing into the inner wall may improve the cooling performance of the motor through heat exchange with the motor.

The vane extension portion may extend up to the inner circumferential surface of the inner wall. With this structure, the vane extension portion may improve flow efficiency with a simple structure. The vane extension portion may minimize the generation of vortex at the downstream end of the inner wall.

The motor housing may further include a vane protrusion portion that further extends from the vane extension portion to radially protrude from the inner circumferential surface of the inner wall toward the rotational shaft. With this structure, the vane protrusion portion may more smoothly guide the flow direction of air from a downstream end of the vane or the inner wall toward the motor, thereby improving the cooling effect of the motor without reducing flow efficiency.

A protrusion length of the vane protrusion portion may be in a range of one time to two times a thickness of the inner wall. Accordingly, the vane protrusion portion may minimize the generation of vortex in the inner wall.

The inner wall and the outer wall may each be formed in a cylindrical shape. A length of the inner wall that axially extends from a point where the vane starts to be formed may be shorter than a length of the outer wall. With this structure, an opening may be formed in a radial direction at the downstream end of the inner wall, to induce air to move toward the motor in the flow direction of air.

The motor housing may include a support portion that is formed to protrude from the inner circumferential surface of the inner wall to support an outer circumferential surface of the stator. An opening may be formed at a downstream end of the inner wall based on the flow direction of air to penetrate radially toward the outer circumferential surface of the stator. With this structure, the vane extension portion may guide the flow direction of air, which has passed through the vane, such that the air moves toward the motor through the opening.

The opening may extend in a circumferential direction along a circumference of the inner wall. The opening may include a plurality of inlets divided by the vane extension portion in a circumferential direction. With this structure, the vane extension portion may uniformly distribute a quantity of air flowing to the inside of the inner wall through the plurality of inlets.

The vane may extend to be inclined with respect to an axial direction along the outer circumferential surface of the inner wall and may be formed in a curved shape. The vane may be provided in plurality spaced apart in a circumferential direction along the outer circumferential surface of the inner wall. With this structure, the plurality of vanes may smoothly guide the flow of air.

A plurality of the vane extension portion and the vane protrusion portion may be provided, respectively, spaced apart in a circumferential direction along the inner circumferential surface of the inner wall. With this structure, the plurality of vane extension portions and vane protrusion portions may uniformly distribute the quantity of air flowing toward the motor.

The vane may be configured as a one-stage vane or an N-stage vane (N is a natural number equal to or greater than 2) separated in the axial direction. With this structure, the one-stage vane may minimize reduction of flow efficiency. The two-stage vane may be easily manufactured.

The motor housing may further include a housing extension portion that extends axially from a downstream end of the outer wall based on the flow direction of air. With this structure, the housing extension portion may improve the cooling effect of the motor without reducing flow efficiency.

A radial width of the vane may be formed at a ratio of 3 to 11% of a diameter of the outer wall. With this structure, the vane may miniaturize the fan motor while minimizing the decrease in flow efficiency.

An axial length of the vane may be formed at a ratio of 25 to 50% of the diameter of the outer wall. This may increase the volume of the inner wall for storing cooling air while minimizing the diameter of the outer wall.

The motor housing may include: a first bearing that is disposed on a downstream side of the impeller based on the flow direction of air to support an upstream side of the rotational shaft; a first bearing housing that accommodates the first bearing therein; and a connection portion that extends radially from an outer circumferential surface of first bearing housing toward an upstream end of the inner wall. With this structure, the first bearing housing and the connection portion may form a space in which the motor is accommodated together with the inner wall.

The stator may be disposed to be spaced apart in the axial direction from an inner surface of the connection portion. The stator may include a stator core and a stator coil wound around the stator core. An upstream end of the stator coil based on the flow direction of air may be disposed to overlap the vane extension portion in a radial direction. With this structure, the vane extension portion may guide the flow direction of air toward the stator coil.

An upstream end of the stator core based on the flow direction of air may be located to correspond to a downstream end of the outer wall. With this structure, air flowing through a flow path between the inner wall and the outer wall and air introduced from the outside of the outer wall through the opening of the outer wall may cool the stator core, thereby improving the cooling performance of the motor.

The motor housing may include at least one or more of a first inner wall portion, a second inner wall portion, a flow path inner wall portion, a flow path outer wall portion, an outer wall, a first vane, and a second vane. The first inner wall portion may have a first thickness and may be formed in a cylindrical shape. The second inner wall portion may be connected to a downstream side of the first inner wall portion based on the flow direction of air, may have a second thickness thicker than the first thickness, and may be formed in a cylindrical shape. The flow path inner wall portion may surround an outer circumferential surface of the first inner wall portion. The flow path outer wall portion may be accommodated inside of a downstream end of the shroud and spaced radially apart from the flow path inner wall portion outside the flow path inner wall portion. The outer wall may be connected to a downstream end of the flow path outer wall portion and disposed radially spaced apart from the second inner wall portion outside the second inner wall portion. The first vane may extend from the outer circumferential surface of the flow path inner wall portion to protrude toward the flow path outer wall portion. The second vane may be connected to communicate with a downstream end of the first vane and extend to protrude from an outer circumferential surface of the second inner wall portion to the outer wall. With this structure, the first vane and the second vane may configure a two-stage vane. The flow path inner wall portion and the flow path outer wall portion may form an upstream flow path of the two-stage vane. The second inner wall portion and the outer wall may form a downstream flow path of the two-stage vane.

The outer wall may be coupled to the downstream end of the shroud. With this structure, the motor housing and shroud may be firmly fastened to each other.

The motor housing may further include a support portion that protrudes radially inward from the inner circumferential surface of the inner wall to support the stator. With this structure, the support portion may support the outer circumferential surface of the stator and also define a space between the outer circumferential surface of the stator and the inner wall, so that air may be introduced through the space.

The motor housing may further include a motor seating portion concavely formed on one side of the support portion to surround an outer circumferential surface of the stator. With this structure, the motor seating portion may form a step with the support portion in a radial direction, thereby restricting movement of the stator in the axial direction.

The fan motor may include at least one or more of a support portion, a second bearing, a coupling portion, and a bridge. The support portion may protrude from the inner circumferential surface of the inner wall toward the rotational shaft to support an outer circumferential surface of the stator. The second bearing may be disposed on a downstream side of the motor based on the flow direction of air, and support a downstream side of the rotational shaft. The second bearing housing may accommodate the second bearing. The coupling portion may be coupled to a downstream end of the support portion. The bridge may extend in a radial direction to be connected to an outer circumferential surface of the second bearing housing and an inner circumferential surface of the coupling portion. With this structure, the coupling portion and the bridge may firmly couple the support portion of the motor housing and the second bearing housing.

According to embodiments disclosed herein, at least the following advantages may be obtained.

First, a motor housing is disposed at a downstream side of an impeller based on a flow direction of air that has passed through the impeller. The motor housing may include an inner wall, an outer wall, and a plurality of vanes. The inner wall forms the inner wall of a flow path part. The inner wall forms a motor accommodating portion that accommodates a motor. The outer wall is disposed toward the outside of the flow path part to be spaced apart from the inner wall. The outer wall forms the outer wall of the flow path part. The plurality of vanes protrude in a radial direction between an outer circumferential surface of the inner wall and an inner circumferential surface of the outer wall. The vane extends to be inclined with respect to the axial direction along the outer circumferential surface of the inner wall. The vane is formed in a curved shape. The vane guides the flow of air passed through the impeller. The motor housing may include a vane extension portion. The vane extension portion extends radially inward from a downstream end of the vane to cover at least a portion of a thickness surface of the inner wall. The vane extension portion may extend up to the inner circumferential surface of the inner wall. With this structure, some of air passing through the flow path part may be guided by the vane extension portion. The vane extension portion may minimize the flow loss of air moving toward the motor accommodating portion.

Second, the motor housing may further include a vane protrusion portion further extending radially inward from the vane extension portion so as to protrude from the inner circumferential surface of the inner wall. The vane extension portion and the vane protrusion portion may improve the cooling performance of the motor while improving the flow efficiency of air guided by the vane.

Third, a plurality of support portions may be disposed on the inner wall. The support portion protrudes in a radial direction from the inner circumferential surface of the inner wall. The support portion extends in the axial direction along the inner circumferential surface of the inner wall. The plurality of support portions may be disposed to be spaced apart in the circumferential direction along the inner circumferential surface of the inner wall. The support portion is formed to surround the outer circumferential surface of the stator of the motor. With this structure, the support portion may support the stator.

Fourth, the support portion may make the inner circumferential surface of the inner wall spaced apart from the outer circumferential surface of the stator, thereby creating a radial gap between the inner wall and the stator. Some of air passing through the vane may move to the motor accommodating portion through the radial gap.

Fifth, an opening may be formed to penetrate one side of the inner wall in the radial direction. The opening may extend in a circumferential direction along a circumference of the inner wall. The opening may include a plurality of inlets disposed at equal intervals along the circumferential direction by the vane extension portions or vane protrusion portions. The plurality of vane extension portions and vane protrusion portions may guide the axial flow of air in the radial direction through the opening. Additionally, the plurality of vane extension portions and vane protrusion portions may evenly distribute the flow of air moving to the motor accommodating portion through the plurality of inlets.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" may include any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A fan motor, comprising:
   a shroud;
   an impeller that is accommodated inside of the shroud, mounted to a rotational shaft, and configured to be rotated by the rotational shaft;
   a motor that includes a rotor connected to the rotational shaft and a stator that surrounds the rotor, the rotational shaft being rotated by the motor; and a motor housing that is coupled to a downstream end of the shroud based on a flow direction of air suctioned into the shroud by the impeller, wherein the motor housing comprises:

an outer wall that is coupled to the shroud to define an appearance of the fan motor together with the shroud;

an inner wall that is disposed inside of the outer wall toward the rotational shaft and accommodates the motor;

a plurality of vanes that extends from an inner circumferential surface of the outer wall to an outer circumferential surface of the inner wall;

a plurality of vane extension portions that extends from a downstream end of each of the plurality of vanes toward the rotational shaft based on the flow direction of air and covers at least a portion of a thickness surface between the outer circumferential surface of the inner wall and an inner circumferential surface of the inner wall; and a plurality of vane protrusion portions that extends from each of the plurality of vane extension portions to radially protrude from the inner circumferential surface of the inner wall toward the rotational shaft, wherein the plurality of vane extension portions and the plurality of vane protrusion portions direct air toward the motor.

2. The fan motor of claim 1, wherein the plurality of vane extension portions extends to the inner circumferential surface of the inner wall.

3. The fan motor of claim 1, wherein a protrusion length of the plurality of vane protrusion portions is in a range of one to two times a thickness of the inner wall.

4. The fan motor of claim 1, wherein the plurality of vane extension portions and the plurality of vane protrusion portions, respectively, are spaced apart in a circumferential direction along the inner circumferential surface of the inner wall.

5. The fan motor of claim 1, wherein the inner wall and the outer wall are each formed in a cylindrical shape, and wherein a length of the inner wall axially extending from a point where the plurality of vanes start to be formed is shorter than a length of the outer wall.

6. The fan motor of claim 1, wherein the motor housing comprises at least one support portion that protrudes from the inner circumferential surface of the inner wall to support an outer circumferential surface of the stator, wherein an opening is formed at a downstream end of the inner wall based on the flow direction of air to penetrate radially toward the outer circumferential surface of the stator, and wherein the plurality of vane extension portion guides the flow direction of air, such that air flowing along the plurality of vanes flows toward the motor through the opening.

7. The fan motor of claim 6, wherein the opening extends in a circumferential direction along a circumference of the inner wall, and wherein the opening includes a plurality of inlets divided by the plurality of vane extension portions in the circumferential direction.

8. The fan motor of claim 1, wherein the plurality of vanes extends at an incline with respect to an axial direction along the outer circumferential surface of the inner wall and is formed in a curved shape, and wherein the plurality of vanes comprises a plurality of vanes spaced apart in a circumferential direction along the outer circumferential surface of the inner wall.

9. The fan motor of claim 1, wherein the plurality of vanes is configured as a one-stage vane or an N-stage vane, N being a natural number equal to or greater than 2, separated in the axial direction.

10. The fan motor of claim 1, wherein the motor housing further comprises a housing extension portion that extends axially from a downstream end of the outer wall based on the flow direction of air.

11. The fan motor of claim 1, wherein a radial width of the plurality of vanes is formed at a ratio of 3 to 11% of a diameter of the outer wall, and wherein an axial length of the plurality of vanes is formed at a ratio of 25 to 50% of the diameter of the outer wall.

12. The fan motor of claim 1, wherein the motor housing further comprises:

a first bearing that is disposed at a downstream side of the impeller based on the flow direction of air to support an upstream side of the rotational shaft;

a first bearing housing that accommodates the first bearing; and a connection portion that extends radially from an outer circumferential surface of the first bearing housing toward an upstream end of the inner wall.

13. The fan motor of claim 12, wherein the stator is spaced apart in the axial direction from an inner surface of the connection portion, wherein the stator comprises:

a stator core; and a stator coil that is wound around the stator core, and wherein an upstream end of the stator coil based on the flow direction of air overlaps the plurality of vane extension portions in a radial direction.

14. The fan motor of claim 13, wherein an upstream end of the stator core based on the flow direction of air is located to correspond to a downstream end of the outer wall.

15. The fan motor of claim 12, wherein the motor housing further comprises:

at least one support portion that protrudes from the inner circumferential surface of the inner wall toward the rotational shaft to support an outer circumferential surface of the stator;

a second bearing that is disposed at a downstream side of the motor based on the flow direction of air to support a downstream side of the rotational shaft;

a second bearing housing that accommodates the second bearing;

a coupling portion that is coupled to a downstream end of the at least one support portion; and a bridge that extends in a radial direction to be connected to an outer circumferential surface of the second bearing housing and an inner circumferential surface of the coupling portion.

16. The fan motor of claim 1, wherein the inner wall comprises:

a first inner wall portion that has a first thickness and is formed in a cylindrical shape; and a second inner wall portion that is connected to a downstream side of the first inner wall portion based on the flow direction of air, has a second thickness thicker than the first thickness, and is formed in a cylindrical shape, wherein a flow path inner wall portion surrounds an outer circumferential surface of the first inner wall portion, wherein a flow path outer wall portion is accommodated inside of a downstream end of the shroud and spaced radially apart from the flow path inner wall portion outside of the flow path inner wall portion, wherein the outer wall is connected to a downstream end of the flow path outer wall portion and disposed radially spaced apart from the second inner wall portion outside the second inner wall portion, and wherein the plurality of vanes comprises:

a first vane that protrudes from an outer circumferential surface of the flow path inner wall portion to the flow path outer wall portion; and a second vane that is connected to communicate with a downstream end of the first vane and protrudes from an outer circumferential surface of the second inner wall portion to the outer wall.

17. The fan motor of claim 16, wherein the outer wall is coupled to the downstream end of the shroud.

18. The fan motor of claim 1, wherein the motor housing further comprises at least one support portion that protrudes radially inward from the inner circumferential surface of the inner wall to support the stator.

19. The fan motor of claim 18, wherein the motor housing further comprises a motor seating portion concavely formed on one side of the at least one support portion to surround an outer circumferential surface of the stator.

* * * * *